(12) United States Patent
Kordon et al.

(10) Patent No.: US 11,017,132 B2
(45) Date of Patent: May 25, 2021

(54) METHOD AND DEVICE FOR MODEL-BASED OPTIMIZATION OF A TECHNICAL DEVICE

(71) Applicant: AVL LIST GMBH, Graz (AT)

(72) Inventors: Michael Kordon, St. Ulrich (AT); Christian Kozlik, Graz (AT); Kurt Klumaier, Graz (AT); Ingo Allmer, Stattegg (AT)

(73) Assignee: AVL LIST GMBH, Graz (AT)

( * ) Notice: Subject to any disclaimer, the term of this patent is extended or adjusted under 35 U.S.C. 154(b) by 568 days.

(21) Appl. No.: 15/568,231

(22) PCT Filed: Apr. 21, 2016

(86) PCT No.: PCT/EP2016/058908
§ 371 (c)(1),
(2) Date: Oct. 20, 2017

(87) PCT Pub. No.: WO2016/170063
PCT Pub. Date: Oct. 27, 2016

(65) Prior Publication Data
US 2018/0113963 A1  Apr. 26, 2018

(30) Foreign Application Priority Data

Apr. 21, 2015 (DE) .......................... 102015207252.5

(51) Int. Cl.
*G06G 7/48* (2006.01)
*G06F 30/20* (2020.01)
(Continued)

(52) U.S. Cl.
CPC ............ *G06F 30/20* (2020.01); *F02D 41/26* (2013.01); *G05B 17/02* (2013.01); *G06F 11/00* (2013.01);
(Continued)

(58) Field of Classification Search
None
See application file for complete search history.

(56) References Cited

U.S. PATENT DOCUMENTS

| 2002/0019695 A1 | 2/2002 | Pflugl et al. |
| 2006/0212140 A1* | 9/2006 | Brackney .............. F02D 11/105 700/29 |

(Continued)

FOREIGN PATENT DOCUMENTS

| CN | 101578558 | 11/2009 |
| CN | 101713321 | 5/2010 |

(Continued)

OTHER PUBLICATIONS

Asprion et al. Optimisation-Oriented Modeling of the NOx Emissions of a Diesel Engine Energy Conversion and Management 75, 2013 pp. 61-73 (Year: 2013).*

(Continued)

*Primary Examiner* — Rehana Perveen
*Assistant Examiner* — Cuong V Luu
(74) *Attorney, Agent, or Firm* — Sheridan Ross P.C.

(57) ABSTRACT

The disclosure concerns a method for model-based optimization, especially calibration, of a technical device, especially an internal combustion engine. The method may involve the following steps: detection of at least a first parameter in relation to the technical device being optimized which characterizes a physical quantity; first determination of at least one second parameter in relation to the technical device being optimized by at least a first physical model which characterizes at least one known physical relationship and for which the at least one first parameter is an input parameter; second determination of at least one third parameter by at least one first empirical model based on measurements on a plurality of already-known technical devices of the same kind, especially internal combustion engines, and (Continued)

for which at least the at least one second parameter is an input parameter, wherein the at least one third parameter is suited to characterizing the technical device being optimized and/or to providing a basis for making a change in the technical device being optimized, especially to adjusting a control unit of the technical device being optimized; and outputting the at least one third parameter.

24 Claims, 17 Drawing Sheets

(51) Int. Cl.
| | |
|---|---|
| *F02D 41/26* | (2006.01) |
| *G06F 11/00* | (2006.01) |
| *G06F 30/17* | (2020.01) |
| *G05B 17/02* | (2006.01) |
| *G06F 30/00* | (2020.01) |
| *G06F 30/15* | (2020.01) |
| *G06F 111/06* | (2020.01) |
| *F02D 41/14* | (2006.01) |

(52) U.S. Cl.
CPC ...... *G06F 30/17* (2020.01); *F02D 2041/1433* (2013.01); *G06F 30/00* (2020.01); *G06F 30/15* (2020.01); *G06F 2111/06* (2020.01)

(56) References Cited

U.S. PATENT DOCUMENTS

| | | | | |
|---|---|---|---|---|
| 2007/0265805 A1* | 11/2007 | Lee | ........................ | G01M 15/05 702/187 |
| 2007/0288213 A1* | 12/2007 | Schantl | .................. | G05B 17/02 703/8 |
| 2009/0271099 A1* | 10/2009 | Jones | .................. | F02D 41/0225 701/115 |
| 2010/0083640 A1 | 4/2010 | Wang et al. | | |
| 2011/0264353 A1* | 10/2011 | Atkinson | ............ | F02D 41/1402 701/102 |
| 2014/0067197 A1* | 3/2014 | Stadlbauer | ........... | G05B 13/042 701/32.8 |
| 2014/0310210 A1* | 10/2014 | Markert | .................. | G06N 20/00 706/12 |
| 2014/0326213 A1 | 11/2014 | Katsumata et al. | | |

FOREIGN PATENT DOCUMENTS

| | | |
|---|---|---|
| CN | 103987947 | 8/2014 |
| DE | 102011013481 | 9/2012 |
| DE | 102012005197 | 6/2013 |
| EP | 1150186 | 10/2001 |
| EP | 1703110 | 9/2006 |
| JP | 2011-021518 | 2/2011 |
| WO | WO 2006/094004 | 9/2006 |
| WO | WO 2013/131836 | 9/2013 |
| WO | WO 2015/052274 | 4/2015 |

OTHER PUBLICATIONS

Li et al. Calibration and Validation of a Mean Value Model for Turbocharged Diesel Engine Advances in Mechanical Engineering, vol. 2013, Article ID 579503, pp. 1-11 (Year: 2013).*
Asprion et al. A Fast and Accurate Physics-Based Model for the NOx Emissions of Diesel Engines Applied Energy 103, 2013, pp. 221-233 (Year: 2013).*
D'Ambrosio et al. A Control-Oriented Real-Time Semi-Empirical Model for the Prediction of NOx Emissions in Diesel Engines Applied Energy 130, 2014 pp. 265-279 (Year: 2014).*
International Search Report prepared by the European Patent Office dated Jun. 23, 2016, for International Application No. PCT/EP2016/058908.
"Cruise Vehicle System Analysis," Advanced Simulation Technologies, 2009, 19 pages.
"Rasante Weiterentwicklung," ETAS Entwicklungs, May 2012, 1 page.
Beer et al. "Vom virtuellen Prüfstand in die Serie," AVL List; ETAS Entwicklungs- und Applikationswerkzeuge für elektronische Systeme GmbH, May 2012, 2 pages.
Gnanam "MoBEO: Model based Engine Development and Calibration," FPC 2015, Feb. 24, 2015, 32 pages.
Fortuna et al. "DoE and beyond—evolution of the model-based development approach," Automobiltechnische Zeitschrift, 2015, Issue 2, pp. 50-55 (English abstract).
Pischinger et al. "Thermodynamik der Verbrennungs—kraftmaschine," Springer Verlag, 2009, 24 pages.
Search Report for German Patent Application No. 102015207252.5, dated Nov. 27, 2015, 8 pages.
International Preliminary Report on Patentability for International (PCT) Patent Application No. PCT/EP2016/058908, dated Nov. 2, 2017, 7 pages.
Official Action with English Translation for Japan Patent Application No. 2017-555354, dated Mar. 30, 2020, 15 pages.
Official Action with English Translation for China Patent Application No. 201680036412.8, dated Jun. 1, 2020, 21 pages.
Official Action with English Translation for Japan Patent Application No. 2017-555354, dated Sep. 7, 2020, 6 pages.
Official Action for China Patent Application No. 201680036412.8, dated Jan. 28, 2021, 11 pages.
Official Action for India Patent Application No. 201717037164, dated Nov. 27, 2020, 6 pages.

* cited by examiner

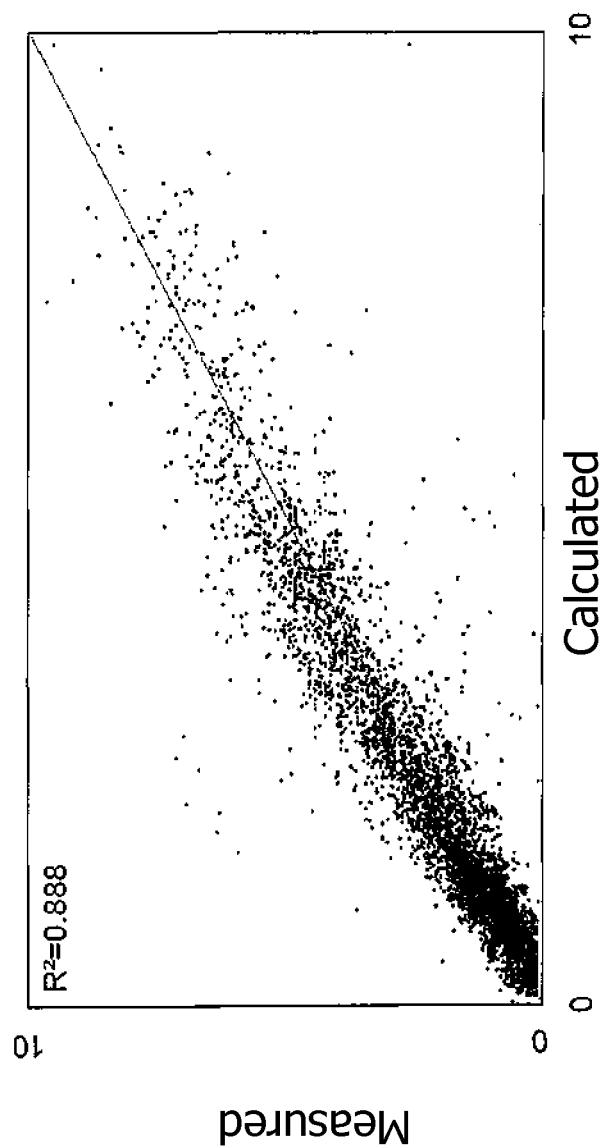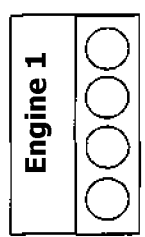
Fig.8

METHOD AND DEVICE FOR MODEL-BASED OPTIMIZATION OF A TECHNICAL DEVICE

CROSS REFERENCE TO RELATED APPLICATIONS

This application is a national stage application under 35 U.S.C. 371 and claims the benefit of PCT Application No. PCT/EP2016/058908 having an international filing date of 21 Apr. 2016, which designated the United States, which PCT application claimed the benefit of German Patent Application No. 10 2015 207 252.5 filed 21 Apr. 2015, the disclosure of each of which are incorporated herein by reference in their entireties.

The invention concerns a method and a device for model-based optimization of a technical device, especially an internal combustion engine.

BACKGROUND

In order to deal with future legislation, as well as the tension between fuel consumption and emissions, combustion engines with all their components are generally optimized as a complete system. An increasing number of control variables and stricter emission and diagnostic requirements are greatly raising the expense of engine development and calibration. At the same time, however, the development time needs to be reduced in order to enable ever-faster product cycles.

In order to handle the increasing development and calibration expense in engine development with reasonable effort, model-based development methods have become an important part of the calibration process. In order to also be able to employ such model-based development methods efficiently in the engine development process, the methods must be able to compute transient processes of the combustion engine in real time. A targeted model-based complete system optimization requires the possibility of non-steady-state or transient operation of the engine model. In this way, concepts can be investigated, evaluated, and possibly optimized in a short time and at favorable cost, typically with the aid of fast and efficient engine models.

Various approaches to the model-based optimization of technical devices, such as internal combustion engines, are known in the prior art. In particular, methods such as the following are used:

EP 1 150 186 A1 involves a method for the automatic optimization of an output quantity in a system dependent on a plurality of input quantities, such as an internal combustion engine, while obeying secondary conditions A theoretical value for the output quantity and the secondary conditions are determined by means of a model function with the input quantities as variables and with the input quantities changed one at a time in sequential individual steps within a variation space. Values for output quantities and secondary conditions corresponding to the respective input quantities are determined directly on the system and used for correction of the model functions until the model functions satisfy the secondary conditions and optimal values are achieved for the output quantity.

WO 2013/131836 A2 concerns a method for the optimization of internal combustion engines, especially for emission and fuel consumption optimization. It teaches that at least one of the secondary influence quantities is adjusted by correction functions in their control devices at each operating point, which are dictated by the parameters of temperature, load, and rotational speed, such that the emission limit values are obeyed in different load/rotational speed ranges and in different temperature ranges. In a first step, a trial band for the operating points and secondary influence quantities is created by the use of a mathematical model of the control device function and the internal combustion engine, in relation to the quantity being optimized. This test band is run on a test stand. In a second step, the data measured on the test stand are used to create a model for each quantity being optimized. In a third step, based on the model created, the optimal values of the secondary influence quantities are determined, while observing the emission limit values. These values are then used for the first parametrization of the correction functions of the control device.

EP 1 703 110 A1 concerns a method for the optimization of the calibration of combustion engines taking into account dynamic changes in the engine's state and making use of a neural net. The calibration test begins with a starting condition and defined changes in selected parameters are used in the calibration process.

DE 10 2011 013 481 A1 concerns a method for the control of a combustion engine and an internal exhaust gas recirculation. The internal exhaust gas recirculation can be adjusted by a variable valve control of the valves of the combustion engine. In the method, a total gas mass and an oxygen content in a combustion chamber of the engine are determined. Moreover, for a predetermined operating point of the combustion engine, a nominal total gas mass and a nominal oxygen content in the combustion chamber are determined. A regulating element of the combustion engine is set in accordance with the total gas mass, the oxygen content and the nominal total gas mass and the nominal oxygen content.

US 2014/0326213 A1 concerns a control unit which predicts a value of a turbocharging pressure on the basis of a predicted value of the degree of a throttle valve opening, making use of a physical model of the turbocharged machine. The control unit also computes a correction quantity. For this, a measurement value of the turbocharging pressure is detected by a turbocharging pressure sensor and an estimated value of the turbocharging pressure is computed on the basis of a measurement value of the degree of throttle valve opening, making use of a physical model of the turbocharged machine. A difference between the measurement value and the estimated value of the turbocharging pressure is computed and the difference is used as a correction quantity for the predicted value of the turbocharging pressure. On the basis of the corrected predicted value of the turbocharging pressure and a predicted value of the degree of throttle valve opening, the control unit computes a predicted value for the quantity of cylinder intake air.

One problem of the prior art and that the disclosed embodiments propose to solve is moving further development tasks from a real to a virtual test stand. In regard to internal combustion engines, a further problem is to undertake the power and emission calibration, preferably also an application under nonstandard environment conditions, on the virtual test stand. A further problem is to preferably make possible a real-time complete system simulation of the technical device. These and other problems are solved according to the inventions claimed herein.

SUMMARY OF DISCLOSED EMBODIMENTS

A method according to this disclosure for model-based optimization, especially calibration, of a technical device, especially an internal combustion engine, preferably involves the following steps: detecting of at least a first parameter in relation to the technical device being optimized, which is suitable to characterizing a physical quantity; first determination of at least one second parameter in relation to the technical device being optimized by at least a first physical model which is suitable for characterizing at least one known physical relationship and for which the at least one first parameter is an input parameter; second determination of at least one third parameter in relation to the technical device being optimized by at least one first empirical model based on measurements on a plurality of already-known technical devices of the same kind, especially internal combustion engines, and for which at least the at least one second parameter is an input parameter, wherein the at least one third parameter is suitable for characterizing the technical device being optimized and/or for providing a basis for making a change in the technical device being optimized, especially for adjusting its control unit; and outputting of the at least one third parameter.

In another method according to this disclosure for model-based optimization, especially calibration, of a technical device, especially an internal combustion engine, a complete system of the technical device being optimized is simulated with at least a first physical model, which characterizes at least one known physical relationship, and with at least one empirical model, which is based on measurements on a plurality of already-known technical devices of the same kind. The at least one physical model and/or the at least one empirical model preferably depends in addition on a machine-specific setting parameter, in order to adapt the respective model to the technical device being optimized. In a first phase of the method, at least one measurement point is measured during operation of the technical device being optimized and the machine-specific setting parameter is determined on the basis of the at least one measurement point, by comparing measured values with values of the measurement point calculated with the aid of the model. In a second phase of the method, no more measurements are taken of the technical device being optimized in operation and the complete system of the technical device being optimized is simulated by means of the at least one physical model and the at least one empirical model, wherein a second parameter determined by means of the at least one physical model goes into the at least one empirical model as input parameter.

A device according to this disclosure for the model-based calibration of a technical device, especially an internal combustion engine, preferably comprises a measurement device for detecting at least one first parameter in relation to the technical device being calibrated, which is suitable for characterizing a physical quantity. Preferably, the device furthermore comprises a storage device, in which at least one first physical model of a known physical relationship and at least one first empirical model based on measurements on a plurality of already-known technical devices of the same kind, especially internal combustion engines, are stored. Furthermore, the device preferably has a first allocation device, in order to allocate the first parameter on the basis of the at least one first physical model to a second parameter, and a second allocation device, in order to allocate a third parameter on the basis of the at least one first empirical model to the second parameter. In addition, the device preferably has an interface for outputting the at least one third parameter, wherein the third parameter is suitable for characterizing the technical device being calibrated and/or for providing a basis for making changes in the technical device being optimized, especially for adjusting its control system.

Detecting, as used in this disclosure, is a reading of parameter values, especially by automatic or manual entry, and/or a performance of measurements to ascertain a parameter. A physical quantity is a quantitatively determinable property of a physical object, process, or state. It is preferably indicated as the product of a numerical value (the measured value) and a unit of measurement. Vector quantities are indicated by a magnitude value and a direction. Preferably, the units of measurement are defined by the SI standard. Determining is the allocating of an output parameter to an input parameter, especially on the basis of a function, a table of functions, or some other allocation rule.

A physical model reflects a known physical relationship which is constructed in particular on basic physical functions. Preferably, physical models are generally valid at least for the kind of technical devices of which one technical device is being optimized, but also in particular for all technical devices. A physical model may consist of a physical formula or also of several physical formulas or physical relationships. An empirical model is constructed in its logic on the basis of measured values on a plurality of already-known technical devices. Preferably, methods of compensation calculation, especially regression models, are used.

Outputting is a representation for a user, or the provision of at least one value to a further step in the method according to the invention. Preferably, a parameter value is used further within the model-based optimization method when output.

A kind denotes an allocation of a technical device to a group of technical devices. The kinds in question are in particular drive machinery, internal combustion engines, gasoline engines, diesel engines, etc., or any other grouping on the basis of technical commonalities of technical devices.

The disclosed methods are based in particular on the approach of interconnecting individual models as submodels in a model-based optimization so as to enable a real-time optimization of the technical device, such as the combustion of an internal combustion engine. In order to make the most accurate possible statements about the behavior of the technical device, empirical models are replaced as much as possible by physical models, which reflect a generally valid physical relationship. The computations are preferably performed in a manner not broken down according to crankshaft angle, i.e., according to the invention one does not compute values over the entire cycle of one crankshaft revolution in cyclical intervals of the crankshaft angle. Instead, preferably only the values are computed at certain crank angle positions, especially at the combustion center (MFB 50%), the time of injection and/or the time of ignition Thanks to the use of a multiplicity of generally valid physical submodels, the number of empirical submodels can be significantly reduced. In this way, the input parameters in the empirical submodels can be chosen so that a multiplicity of engines with the identical set of input parameters can be simulated. The adaptations of the individual empirical submodels to the respective technical device being optimized can be performed through setting parameters.

The setting parameter here preferably enters into the corresponding model as an additional input parameter. Especially preferably, the machine-specific setting parameter is an input parameter in the empirical model. As an input parameter, the machine-specific setting parameter preferably has a coefficient in a polynomial model approach, like all other terms of the polynomial. The setting parameter of a model is preferably constant over the operating range of the individual technical device, but it will vary according to the technical device. By contrast, the coefficients of the model are preferably constant for the entire operating range of a technical device, but also for all other technical devices. Since a setting parameter is no mere offset value, it is not only the position of the functions of the individual model that will change, but also its model quality; in particular, the coefficient of determination $R^2$ may be significantly improved in regard to the residues.

The determined crank angle positions at which the parameters are computed are processed causally one after the other in the sequence of the combustion process. For example, in an internal combustion engine, starting from the beginning of injection of the first injection process and the resulting effects on the subsequent injections, a resulting engine power, heat fluxes into the coolant water and into the exhaust gas, and nitrogen oxide emissions are calculated.

Furthermore, in regard to internal combustion engines it is also possible to create submodels which, although not working directly in the cylinder during the combustion, are of great importance to a real-world application, such as engine friction. With regard to an internal combustion engine, it is also possible to calculate power losses through the cylinder walls, without having to break down combustion according to the crankshaft angle. Knowledge of the power loss through the cylinder walls is an essential prerequisite for the quasi-physical calculation of engine power and exhaust gas enthalpy. In regard to the internal combustion engine, the following parameters at least can be computed by the model: combustion characteristics (start, center of gravity and peak pressure, heat flux, engine power, gas temperature, nitrogen oxide emissions or soot emissions).

For the empirical models, a multiplicity of measurements are preferably performed on a plurality of already-known technical devices and with the help of the measurement data, especially by means of regression analysis, empirical models, especially polynomial models, are created. The quality of the empirical model will be better the more known technical devices of the same kind as the technical device being optimized are used to create the empirical model. In particular, the device for model-based optimization can provide qualitatively and also quantitatively valid information without the availability of measurement data.

If an especially high model quality is desired for a simulation, the value of the setting parameter of an empirical submodel can be determined exactly by means of measuring a few operating points or even only a single operating point. This setting parameter is then constant over the entire operating range of the technical device being optimized. For example, the setting parameter can be determined by a measurement under standard conditions on a test stand. After this, the calibration of the technical device on the test stand can be continued under standard conditions, while the calibration for other conditions is done with the model.

In one advantageous embodiment, at least the second determination of the at least one third parameter is performed at one predetermined moment of time, especially crankshaft position, of the technical device, especially an injection time, a closing of an intake valve, an ignition time and/or a combustion center (MIB 50%). Since the method according to the invention or computations performed to carry out the method are not calculated over the entire cycle of the crankshaft, i.e., not broken down according to crankshaft angle, the computing time as well as the required computing power of a device according to the invention can be significantly reduced with no significant information loss.

In another advantageous embodiment of the method, it furthermore includes the work step of normalizing the at least one first parameter and/or the at least one second parameter and/or the at least one third parameter, preferably in relation to a performance potential of the technical device being optimized, especially in relation to a displacement of the internal combustion engine. By the normalization, in particular, it is possible to represent generally valid relationships with the method according to the invention which are not limited to a technical device. In the case of an internal combustion engine, the parameters are preferably related specifically to the liter displacement. Based on this, the following specific measurement quantities may be used as needed:

fuel quantity in mg/combustion cycle/L
fuel energy in W/L
enthalpy flows into and out of the cylinder in W/L
wall heat flux in W/L
indicated power of high-pressure and low-pressure loops in W/L.

In another advantageous embodiment of the method, it furthermore involves the work steps of the third determination of at least one fourth parameter by a second physical model and/or by a second empirical model on the basis of the at least one third parameter and/or on the basis of at least one first parameter from a plurality of first parameters and/or at least one second parameter from a plurality of second parameters. Preferably, the at least one fourth parameter is suited to characterizing the technical device being optimized and/or to providing the basis for making a change in the technical device being optimized, especially to adjusting a control system of the technical device being optimized. Further preferably, this fourth parameter is output in a further work step.

With the disclosed model-based optimization methods, the function of the technical device is processed in a cascade-like manner. Output parameters of submodels systematically enter into further submodels as input parameters. Inputs into the empirical submodels should be calculated whenever possible by known physical relationships with the aid of physical models. In order to continue the cascade-like structure of the method for model-based optimization, another advantageous embodiment of the method involves the work steps of the fourth determination of at least one additional parameter by at least one additional physical model and/or by at least one additional empirical model on the basis of the at least one third parameter and/or on the basis of the at least one fourth parameter and/or on the basis of at least one of a plurality of parameters and/or at least a plurality of second parameters, wherein the at least one additional parameter is suited to characterizing the technical device being optimized and/or to providing a basis for making a change in the technical device being optimized Preferably, the method also includes a work step of outputting of the at least one additional parameter.

In another advantageous embodiment, the third determination of the fourth parameter and/or the fourth determination of the additional parameter is done at a different point in time of the technical device than the second determination of the third parameter. In this way, points of time which are relevant for the respective physical or empirical model are processed consecutively in the sequence of the function of the technical device. Information obtained from the previously-computed submodels flows directly into the next submodel in this process.

In another advantageous embodiment, the detection, the first determination, the second determination and optionally the third determination and the fourth determination are performed without measurements on the technical device being optimized. The method has the special advantage that an optimization can be conducted after some initial adaptation of the model or models, entirely without further measurements on a vehicle on the test stand or in real driving operation. In particular, tests which would need to be performed under nonstandard environmental conditions can be run here merely by a simulation.

In another method for model-based optimization of a technical device, especially an internal combustion engine, a complete system of the technical device being optimized is simulated with at least one physical model, which characterizes at least one known physical relationship, and at least one empirical model, which is based on measurements on a plurality of already-known technical devices of the same kind Preferably, the at least one physical model and/or the at least one empirical model depends in addition on a machine-specific setting parameter, in order to adapt the respective model to the technical device being optimized Especially preferably, only the at least one empirical model depends on a machine-specific setting parameter. Further preferably, in a first phase of the method at least one measurement point is measured during operation of the technical device being optimized and the machine-specific setting parameter is determined on the basis of the at least one measurement point, by comparing measured values with values calculated with the aid of the model. Further preferably, in a second phase of the method no more measurements are taken and the complete system of the technical device being optimized is simulated by means of the at least one physical model and the at least one empirical model. Preferably, a second parameter determined by means of the at least one physical model enters into the at least one empirical model as input parameter. Further preferably, the machine-specific setting parameter enters into the at least one physical model as a further input parameter.

In another advantageous embodiment, at least one of the physical models used and/or at least one of the empirical models used depends in addition on a machine-specific setting parameter in order to adapt the respective model to the technical device being optimized, wherein preferably a different setting parameter is used for each different model. The respective setting parameters are used in the submodels in order to adapt them to the particular technical device.

For an internal combustion engine, preferably each setting parameter is the same for all operating points for a combustion system consisting of nozzle, spiral and combustion chamber. The setting parameters are not set individually for each operating point, but only for one hardware configuration in each case. Preferably, however, the setting parameter may also be a function which depends on other parameters. Further preferably, the setting parameters are based on physically-based effects which are, however, hard to include in a model on account of their complexity. In the case of an internal combustion engine, for example, this may be the interaction between the injection jet and the piston bowl during combustion. Preferably, the setting parameters are integrated directly into the model structure, so that it is possible to properly simulate direct or indirect effects whose influences do not have the same contribution for all model inputs.

With the empirical submodels and their mostly physically-calculated input quantities, it is possible, in the case of internal combustion engines, to calculate the combustion in new engines without adapting the model coefficients simply by specifying the states upstream and downstream of the cylinder at predetermined moments of time, the geometrical data, the fuel properties, the injection parameters from the engine control unit, and by adapting the setting parameters. The setting parameters represent a good compromise between parametrization expense and model accuracy and are used in particular for a diesel engine or gasoline engine in order to adapt the compression, the ignition delay, the burn rate as well as the lost power, especially the friction power, specifically to the engine. In this way, with the same submodels, the combustion process can be calculated preferably for internal combustion engines not involved in the creation of the empirical model (but of the same kind). The setting parameters for the empirical submodels are chosen such that all engines can be simulated with the very same set of parameters. The use of setting parameters as additional model inputs for the empirical submodels has the benefit that interactions between setting parameters and model input parameters may occur, with the setting parameters therefore not being constant offsets or factors.

In another advantageous embodiment, one may use as the setting parameter a compression setting parameter or polytropic exponent setting parameter for a polytropic exponent model, an ignition delay setting parameter for an ignition delay model, a combustion center setting parameter for the combustion center model (MFB 50%), an engine friction setting parameter for a friction performance model, a residual gas setting parameter for a residual gas content model, an admission calculation setting parameter for a fresh air mass model, a high-pressure performance setting parameter for a model of the indicated high-pressure performance and/or a charge exchange loss setting parameter for a charge exchange loss model. For the optimization of a diesel engine, one will preferably use the compressions setting parameter, the ignition delay setting parameter, the combustion center setting parameter and the engine friction setting parameter. For a gasoline engine, one will preferably use the ignition delay setting parameter, the combustion center setting parameter, the engine friction setting parameter, the admission calculation setting parameter, the residual gas content setting parameter, the charge exchange loss setting parameter and the high-pressure performance setting parameter.

In another advantageous embodiment, a value of at least one machine-specific setting parameter is identical for all operating points of the technical device being optimized, especially the internal combustion engine, wherein the internal combustion engine is preferably defined by at least one of the following groups: nozzle, combustion chamber, and charge movement, especially swirl or tumble; valve characteristics and intake geometry; power loss characteristics. For a diesel engine, for example, the setting parameters are preferably identical for all operating points for a combustion system consisting of nozzle, swirl and combustion chamber. Thus, the setting parameters do not need to be adjusted individually for each operating point, but rather only for one hardware configuration of the engine. For the calculation of new engines for which no measurement data are available, one may use as the base value, for example, the mean values for the setting parameters found during the creation of the model.

In another advantageous embodiment, the machine-specific setting parameter is another input parameter for the respective model which is constant for the entire operating range of the technical device being optimized. As already mentioned, the setting of the machine-specific setting parameter is done in accordance with the technical device being optimized. For the simulation of a single device, the setting parameter is preferably constant. The method according to the invention therefore allows an especially simple and one-time adaptation of the total model or the respective submodels to a specific technical device. Therefore, in another advantageous embodiment, as the starting value for a machine-specific setting parameter of the technical device being optimized one determines a value based on the values of setting parameters of the plurality of already-known technical devices, i.e., especially a mean value.

In another advantageous embodiment, it furthermore preferably comprises the following steps: measuring of at least one measurement point in the operation of the technical device being optimized; and determination of the machine-specific setting parameter on the basis of the at least one measurement point by comparing measured values to calculated values of the first parameter or second parameter for identical input parameters.

In another advantageous embodiment, it furthermore preferably comprises the step of the detection of the at least one second parameter and the determination of the at least one machine-specific setting parameter on the basis of the at least one detected second parameter, especially by comparing at least one detected value to at least one value of the at least one third parameter determined with the aid of the first empirical model. Further preferably, the at least one third parameter is also detected and the at least one machine-specific setting parameter on this basis, especially by comparing at least one detected value to at least one value of the at least one third parameter determined with the aid of the first empirical model. Further preferably, the at least one fourth parameter is also detected and the at least one setting parameter on the basis of the detected at least one fourth parameter, especially by comparing at least one detected value to at least one value of the at least one fourth parameter determined with the aid of the second empirical model.

Further preferably, the at least one additional parameter is detected and the at least one setting parameter is determined on the basis of the detected at least one parameter, especially by comparing at least one detected value to at least one value of the at least one additional parameter found with the aid of the additional empirical model.

In another advantageous embodiment of the method, it furthermore comprises the step of changing at least one first parameter of the technical device being optimized on the basis of the at least one third parameter, the at least one fourth parameter and/or the at least one additional parameter. The method could also comprise the step of changing the at least one first parameter of the technical device being optimized on the basis of the at least one third parameter, the at least one fourth parameter and/or the at least one additional parameter. The values of the respective parameters or the value curves of the respective parameters as determined by the method according to the invention for model-based optimization allow inferences as to how the technical device in itself or its control system needs to be changed in order to optimize the function of the technical device.

In another advantageous embodiment of the disclosed method, it furthermore comprises the step of evaluation of the at least one third parameter, the at least one fourth parameter and/or the at least one additional parameter with the aid of a reference. In this way, an evaluation of the configuration of a technical device subjected to the method according to the invention can be evaluated with the aid of various criteria. Preferably, this evaluation is also output. The at least one first parameter is specified or set by a control unit of the technical device being optimized. In this way, the control function or functions programmed on a control unit for the technical device can be tested. The response of the method according to the invention will correspond to the simulated reaction of the technical device. The at least one first parameter can also be influenced by a change in the design features of the technical device being optimized.

In another advantageous embodiment of the method, the at least one empirical model is a polynomial model, whose coefficients are determined with the aid of measurements on the plurality of already-known technical devices of the same kind, especially internal combustion engines, by a compensation calculation, wherein the setting parameter is an input parameter of the empirical model, which is multiplied by at least one coefficient and which is constant for the technical device being optimized. The first parameter can here be chosen to be at least one from the following groups:

geometrical data, especially bore, stroke, connecting rod length, compression ratio, number of cylinders, number of injection orifices, injection nozzle flow rate and/or ratio of cylinder surface to cylinder volume, crank radius, displacement of a cylinder, compression volume of a cylinder, effective flow cross section of a nozzle orifice, nozzle orifice diameter, valve lift curves, charge movement flap;

data regarding an operating point, especially the beginning of injection of the main injection, rotational speed, main injection quantity, pre-injection quantity, post-injection quantity, beginning of injection for a post-injection, cylinder pressure at injection start, pressure in the intake pipe, piston travel at injection start, piston displacement at injection start, cylinder volume at injection start, temperature at injection start, coolant temperature, oil temperature, ignition time;

air pathway-related data, especially charge pressure, charge air temperature, pressure in the exhaust manifold, pressure after the turbine, intake and exhaust vale opening and closing times, EGR rate, volumetric efficiency, absolute humidity, oxygen concentration in air, pressure and temperature in the intake pipe, temperature in the exhaust manifold, maximum intake and exhaust valve lift;

fuel system-related data, especially hydraulic delay for start of injection, hydraulic delay for end of injection, fuel density, duration of the main injection, injection start, preferably start of flow of main injection, injection end, injection pressure, start of flow of pre-injection, and/or start of flow of post-injection, intake manifold temperature, fuel fraction of tank ventilation;

combustion-related data, especially lower calorific value, lambda value, cylinder surface for a crank angle of 50% burned mixture (MFB 50%), volume-specific fuel efficiency, volume-specific fuel quantity, volume-specific fuel efficiency of a post-injection.

In another advantageous embodiment of the method at least one of the following groups may be chosen as a second parameter and/or fourth parameter, determined on the basis of a physical model:

Fuel mass flow, in particular able to be calculated from the volume consumed in a measurement period and the known fuel density, with the input parameter for a physical model to determine the fuel mass flow in the cylinder being at least one parameter chosen from the following group:
Fuel density;
Pre-injection quantity;
Main injection quantity;
Post-injection quantity;

Gas composition in the cylinder, especially the oxygen concentration in the cylinder, with the input parameter for a physical model to determine the gas composition in the cylinder being at least one parameter chosen from the following group:
lambda;
EGR rate or residual gas content in the cylinder;
Humidity;
The mass-related heat quantity, with the input parameter for a physical model to determine the mass-related heat quantity being at least one parameter chosen from the following group:
Fuel mass flow;
Total cylinder mass flow incl. residual gas;
Lower calorific value;
Piston movement, especially mean piston velocity, piston velocity at injection start, cylinder volume at injection start and/or a compression ratio at injection start, especially an effective compression ratio at injection start, cylinder volume with inlet valve closed, cylinder volume at ignition time, piston velocity with inlet valve closed, piston velocity at ignition time, with the input parameter for a physical model to determine the piston movement being at least one parameter chosen from the following group:
Rotational speed;
Stroke;
Crank radius;
Connecting rod length;
Crankshaft angle at injection start;
Polytropic exponent;
Cylinder pressure at injection start;
Pressure in intake pipe;
Displacement of a cylinder;
Compression volume of a cylinder;
Piston travel at injection start;
Bore;
Displacement at injection start;
Piston travel at ignition time;
Displacement at ignition time;
Piston travel at closing of inlet valve;
Displacement at closing of inlet valve;
The thermodynamic state in the cylinder at injection start, with the input parameter for a physical model to determine the thermodynamic state in the cylinder at injection start being at least one parameter chosen from the following group:
Cylinder pressure at injection start;
Temperature at injection start;
Total mass in the cylinder;
Ideal gas constant;
The thermodynamic state in the cylinder at inlet valve closing, with the input parameter for a physical model to determine the thermodynamic state in the cylinder at inlet valve closing being at least one parameter chosen from the following group:
Pressure in the cylinder at inlet valve closing;
Gas mixture temperature in the cylinder at inlet valve closing;
Air mass in the cylinder (fresh air and residual gas);
Fuel mass in the cylinder;
Gas constant of the air/fuel mixture in the cylinder;
The thermodynamic state in the cylinder at ignition time, with the input parameter for a physical model to determine the thermodynamic state in the cylinder at ignition time being at least one parameter chosen from the following group:
Pressure in the cylinder at ignition time;
Gas mixture temperature in the cylinder at ignition time;
Air mass in the cylinder (fresh air and residual gas);
Fuel mass in the cylinder;
Gas constant of the air/fuel mixture;
Exit velocity from a nozzle and/or droplet diameter, with the input parameter for a physical model to determine the exit velocity from a nozzle being at least one parameter chosen from the following group:
Cylinder pressure at injection start;
Injection pressure;
Fuel density;
Flow rate of injection nozzle, especially per manufacturer;
Number of nozzle orifices;
Effective flow cross section of nozzle orifice;
Nozzle orifice diameter;
Properties of the fuel, especially surface tension of a fuel and/or kinematic viscosity of the fuel;
Charge density at injection start;
Cylinder pressure at injection start;
Mean droplet diameter;
Droplet diameter, with the input parameter for a physical model to determine the droplet diameter being at least one parameter chosen from the following group:
Injection pressure.
Effective flow cross section of nozzle orifice;
Nozzle orifice diameter;
Combustion start, with the input parameter for a physical model to determine the combustion start being at least one parameter chosen from the following group:
Injection start or ignition time;
Ignition delay;
Exhaust gas temperature at cylinder exit, with the input parameter for a physical model to determine the exhaust gas temperature at cylinder exit being at least one parameter chosen from the following group:
Power loss through cylinder walls;
Indicated mean pressure;
Chemically bound energy of the fuel
Inlet enthalpy In another advantageous embodiment of the method, the third parameter, fourth parameter and/or additional parameter is/are may be at least one parameter chosen from the following group, determined on the basis of an empirical model:
Pressure in the cylinder at inlet valve closing, with the input parameter for an empirical model to determine the pressure in the cylinder at inlet valve closing being at least one parameter chosen from the following group:
Time of inlet valve closing;
Pressure and temperature in the intake pipe:
Piston velocity at inlet valve closing;
Fuel quantity in the cylinder at the time of inlet valve closing;
Distinguishing criterion for inlet valve closing before or after charge exchange upper dead center;
Polytropic exponent, especially temperature and pressure at injection start, with the input parameter for an empirical model to determine the polytropic exponent being at least one parameter chosen from the following group:
Rotational speed;
Gas mixture temperature in the cylinder at inlet valve closing;

Basis polytropic exponent;
Injection start;
Intake manifold temperature;
Mass-related heat quantity;
Cylinder volume at ignition time;
Lambda value;
Polytropic exponent setting parameter
Ignition delay, with the input parameter for an empirical model to determine the ignition delays being at least one parameter chosen from the following group:
Rotational speed;
Gas temperature and/or pressure in the cylinder at start of injection or at ignition time;
Inlet valve lift;
Position of charge movement flap;
Droplet diameter;
Oxygen concentration;
Piston velocity at injection start;
Ignition delay setting parameter;
Residual gas content in the cylinder;
Mean piston velocity;
Lambda value:
Ignition time;
Fuel quantity equivalent for fuel quantity in the cylinder;
Combustion center, with the input parameter for an empirical model to determine the combustion center being at least one parameter chosen from the following group:
Rotational speed;
Residual gas content in the cylinder;
Inlet valve lift;
Injection duration;
Ignition delay;
Exit velocity from injection nozzle;
Oxygen concentration in a combustion chamber;
Ignition time;
Lambda;
Mean piston velocity;
Position of the charge movement flap;
Power loss through the cylinder walls, with the input parameter for an empirical model to determine the power loss through the cylinder walls being at least one parameter chosen from the following group:
Volume-specific fuel efficiency of the main injection;
Surface/volume ratio of a combustion chamber;
Piston velocity;
Residual gas content in the cylinder;
1/lambda;
Combustion center and/or cylinder surface at combustion center;
EGR rate;
Combustion start;
Temperature at injection start;
Volume-specific fuel efficiency of a post-injection;
Injection start of the post-injection;
Distinguishing criterion power loss calculation for high and low engine loads;
Pressure in cylinder at ignition time;
Gas mixture temperature in cylinder at ignition time;
Indicated mean pressure of the high-pressure loop, with the input parameter for an empirical model to determine the indicated mean pressure of the high-pressure loop being at least one parameter chosen from the following group:
Volume-specific fuel efficiency;
Volume-specific wall heat flux;
Combustion start;
Combustion center, especially combustion duration until combustion center;
Volume-specific fuel efficiency of a post-injection;
Injection start of a post-injection;
Distinguishing criterion calculation of indicated power for high and low engine loads;
Setting parameter;
Lambda value;
Piston velocity;
Cylinder peak pressure, with the input parameter for an empirical model to determine the cylinder peak pressure being at least one parameter chosen from the following group:
Pressure at injection start of main injection;
Combustion start;
Burn-through duration;
Specific fuel mass, especially from fuel mass flow;
Frictional power, with the input parameter for an empirical model to determine the frictional power being at least one parameter chosen from the following group:
Cylinder peak pressure;
Mean piston velocity;
Coolant temperature;
Oil temperature;
Setting parameter engine friction;
High-pressure power;
Charge exchange losses
Pressure in intake pipe;
Pressure in exhaust manifold;
Bore;
Fresh air quantity taken in:
Inlet valve lift;
Setting parameter;
Nitrogen oxide emissions, with the input parameter for an empirical model to determine the nitrogen oxide emissions being at least one parameter chosen from the following group:
Oxygen concentration at combustion start (from the gas composition);
Combustion start for the main injection;
MIB 50%;
Setting parameter;
Scavenging parameter;
Combustion duration from combustion start to combustion center;
Rotational speed;
1/lambda;
Temperature for injection at start of main injection;
Mean piston velocity;
Gas mixture temperature in the cylinder at ignition time;
Lambda equivalent;
Fresh air quantity in the cylinder;
Residual gas content in the cylinder;
Combustion duration parameter.
Hydrocarbon emissions, with the input parameter for an empirical model to determine the hydrocarbon emissions being at least one parameter chosen from the following group:
Mean piston velocity
Fresh air quantity in the cylinder
Lambda equivalent
Combustion duration from start to MFB50%
Indicated mean pressure
Cylinder wall temperature
Residual gas content in the cylinder Scavenging parameter Combustion duration parameter.

Carbon monoxide emissions, with the input parameter for an empirical model to determine the carbon monoxide emissions being at least one parameter chosen from the following group:

Lambda equivalent;

Mean piston velocity;

Fresh air quantity in the cylinder;

Temperature of recirculated exhaust gas;

Injection start and duration of the first and further injections;

Residual gas content in the cylinder;

Combustion duration parameter;

Scavenging parameter.

Soot emission, with the input parameter for an empirical model to determine the nitrogen oxide [sic] emissions being at least one parameter chosen from the following group:

Lambda;

EGR rate;

Injection pressure.

In another advantageous embodiment of the disclosed method, the at least one first, the at least one second and/or the at least one third empirical model is determined from the measurements of a plurality of already-known technical devices by a method of limited square errors. Typically at least four different empirical models go into the calibration, preferably at least six different empirical models, especially preferably eight different empirical models, most preferably eleven different empirical models are used. It also is typical that one machine-specific setting parameter goes into each of the at least four different empirical models as input parameters. These models can determine a polytropic exponent, an ignition delay, a combustion center and a frictional power.

In another advantageous embodiment of the described method, at least one first parameter in regard to the technical device being optimized, characterizing a physical quantity, is an input parameter of the at least one physical model and a third parameter determined by means of the at least one empirical model is output, which is suited to characterizing the technical device being optimized and/or to providing a basis for making a change in the technical device being optimized, especially to adjusting a control system of the technical device being optimized.

Further features, advantages and application possibilities of the disclosed methods and devices will emerge from the following description in connection with the figures. At least schematically in some instances:

DESCRIPTION OF THE DRAWINGS

FIG. 8 shows a parity chart for an empirical model;

DETAILED DESCRIPTION

In the following, the embodiments shall be described with the aid of an internal combustion engine as the technical device, especially a diesel engine. However, the described methods and devices can also be used in principle for the optimization of other technical devices having modes of functioning which permit division into measured physical quantities, physical models and empirical models.

Figure 1:
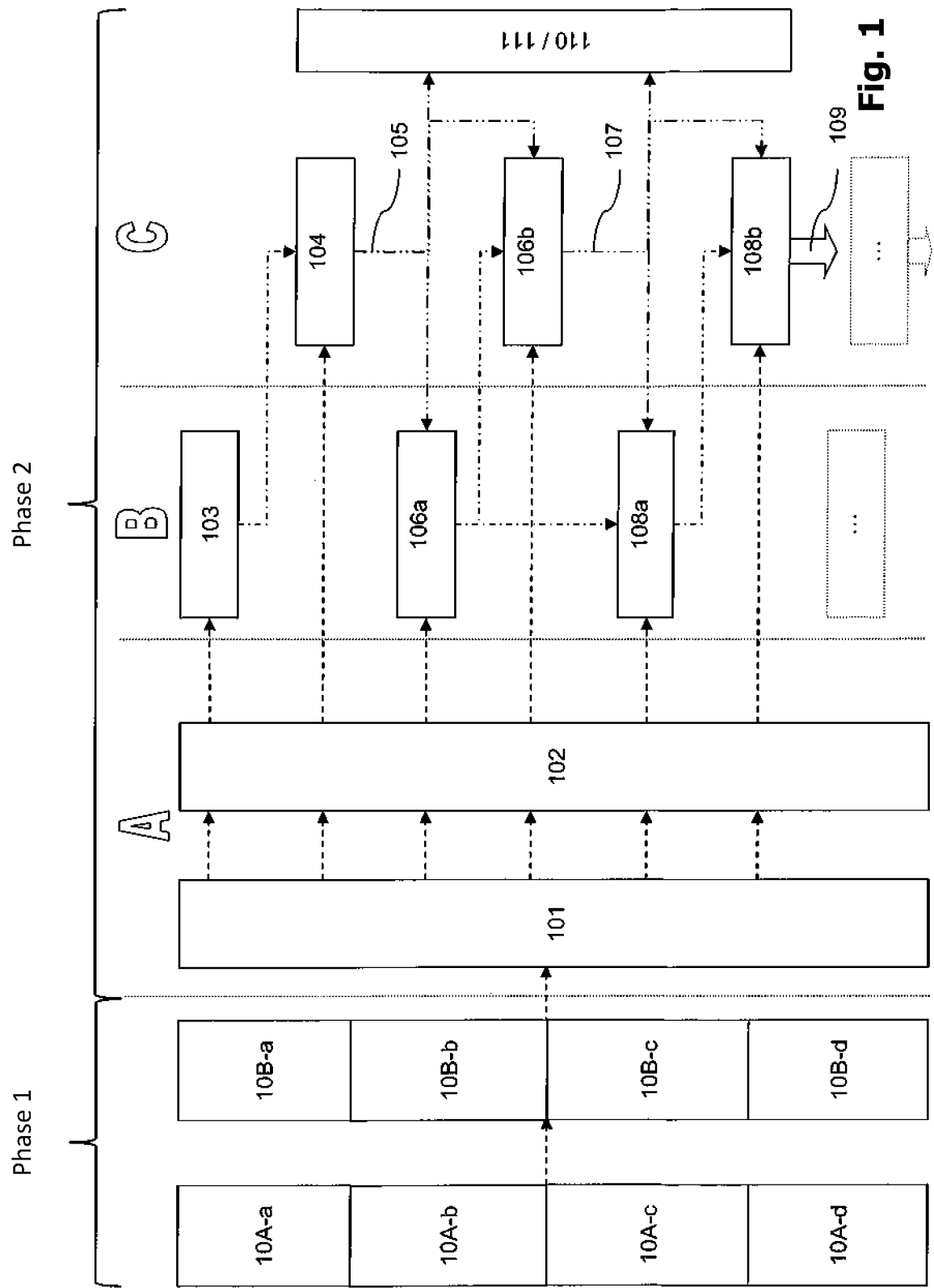
FIG. 1 shows a block diagram of one embodiment of a described method for model-based optimization of a technical device.

With the aid of the block diagram from FIG. 1 the sequence of a method for model-based optimization shall be explained. In this model-based optimization, one can use on the one hand physical models, which characterize at least one known physical relationship, and on the other hand empirical models, which are created by means of a compensation calculation, especially a regression analysis, on the basis of a plurality of already-known technical devices of the same kind.

The method can be divided into two phases. In a first phase (phase 1), the empirical models, which reflect generally valid dependencies for a class of internal combustion engines, are adapted to the internal combustion engine being optimized. For this, the fewest possible number of measurement points are measured during operation of the internal combustion engine being optimized, for example on a test stand, 10A. In addition, the empirical model or models are given the same values for the input parameter as the internal combustion engine on the test stand, i.e., the simulation is carried out for the same measurement point. Measured values of output parameters, i.e., operating parameters of the internal combustion engine, which are set as a result of the assigning of input parameters, are compared to values which were determined for the measurement point with the aid of the empirical model or models being adapted. The setting parameter of the empirical model or setting parameters of empirical models are finally chosen such that the greatest possible agreement is reached with the measured values of the output parameters 10B. For this, methods of compensation calculation such as regression analysis or the method of least error squares can be used in particular.

The second phase in turn can be broken down into three functional sections A, B, C. In section A, physical quantities are ascertained, in particular entered or measured, which serve as input parameters in the models or submodels used according to the invention. In section B, the physical models used in the method according to the invention are summarized, receiving on the one hand physical quantities as input parameters and on the other hand passing on output parameters determined with the aid of the physical models to empirical models in section C as input parameters.

The empirical models in section C also optionally have physical quantities as input parameters, which are directly detected quantities not having gone through any physical model. In turn, output parameters of the empirical models in section C may serve as input parameters for the physical models in section B or other empirical models in section C. In this way, the combustion process of an internal combustion engine is simulated in a cascade-like manner, where in particular the sequence of the empirical submodel used in the method.

In order to have the greatest global validity, the largest possible portions from the prior art of the physical relationships contained in the empirical models are moved to the physical model. This enables the number of input parameters for the empirical models to be reduced. In this way, it is easy to alter geometrical boundary conditions for an existing technical device and ascertain the changes caused by this.

The steps of the method preferably follow the sequence indicated by the sequence of the individual steps indicated in the claims, which is also reflected in FIG. 1. However, the steps may also run in a different sequence, as long as a modeling of the functional dependencies is possible. Physical quantities are preferably detected on the internal combustion engine being optimized in order to characterize the internal combustion engine 101.

The physical quantities characterize the technical device and/or its class quite generally and may be divided basically into two categories. On the one hand, they may be physical quantities which are dictated or set by a control unit of the technical device being optimized, for example, the throttle valve position, etc. Alternatively or additionally, these physical quantities may be design features of the technical device being optimized, which are either known as design data or can be measured. Examples of these are nozzle geometry, combustion chamber and charge movement, especially swirl or tumble, valve characteristics, inlet channel geometry and/or power loss characteristics. Preferably, the detected physical quantities also allow more detailed statements regarding the functioning of the internal combustion engine. The first parameters so detected are preferably chosen such that the physical models in section B and/or the empirical models in section C are provided with the necessary input parameters.

The detected physical quantities are preferably normalized in a further step, in order to make the physical quantities comparable in regard to internal combustion engines of the same class, but for example with different performance levels, 102. In a following step, at least one of the detected physical quantities is used to calculate a physical submodel, 103. The output parameter or parameters derived from the physical model are used in turn to calculate an empirical submodel in a next step, 104. It is also preferably possible to make use of several physical models in order to provide the empirical submodel computed in step 104 with input parameters. Furthermore, preferably, detected physical quantities may go directly into the computation 104 of the empirical submodel.

In another step, the output parameter or parameters of the computed empirical model are transferred to a physical model in section B or an empirical model in section C, 105. Preferably, these further submodels indicate relationships which occur temporally following the empirical submodel computed in step 104 in the sequence of the combustion process. If the output parameter or parameters from step 104 are passed on to a physical model, an additional output parameter will be computed by means of this in a further step 106a, which in turn is output to a third physical model or to a second empirical model, 107a.

In a further step, preferably the second empirical model is computed, 106b, with the output parameter from the first empirical model, the output parameter from the second physical model and/or an additional physical quantity preferably serving as input parameter. The output parameter output from the second empirical model serves as input parameter for the third physical model and/or a third empirical model and is therefore preferably output to this, 107b. Preferably, an additional output parameter is computed in the third physical model, 108a, preferably with the aid of the output parameter output from the second physical model, the output parameter output from the second empirical model and/or an additional detected physical quantity, 108a. The output value of the third physical model is passed on to the third empirical model and the third empirical model is computed with the aid of this parameter, the output parameter of the second empirical model and/or another physical quantity, 108b, and preferably output, 109b.

The cascading procedure presented above in regard to FIG. 1 of a combination of information from detected physical quantities, from physical models and from empirical models can be repeated as often as desired, as is likewise indicated in FIG. 1. Preferably, each parameter that is output can be presented to a user or also be used by comparison with a reference value to evaluate the internal combustion engine being optimized Finally, parameter values so obtained can be used for optimization by means of a changing of the configuration of the internal combustion engine 110, 111.

Figure 2:
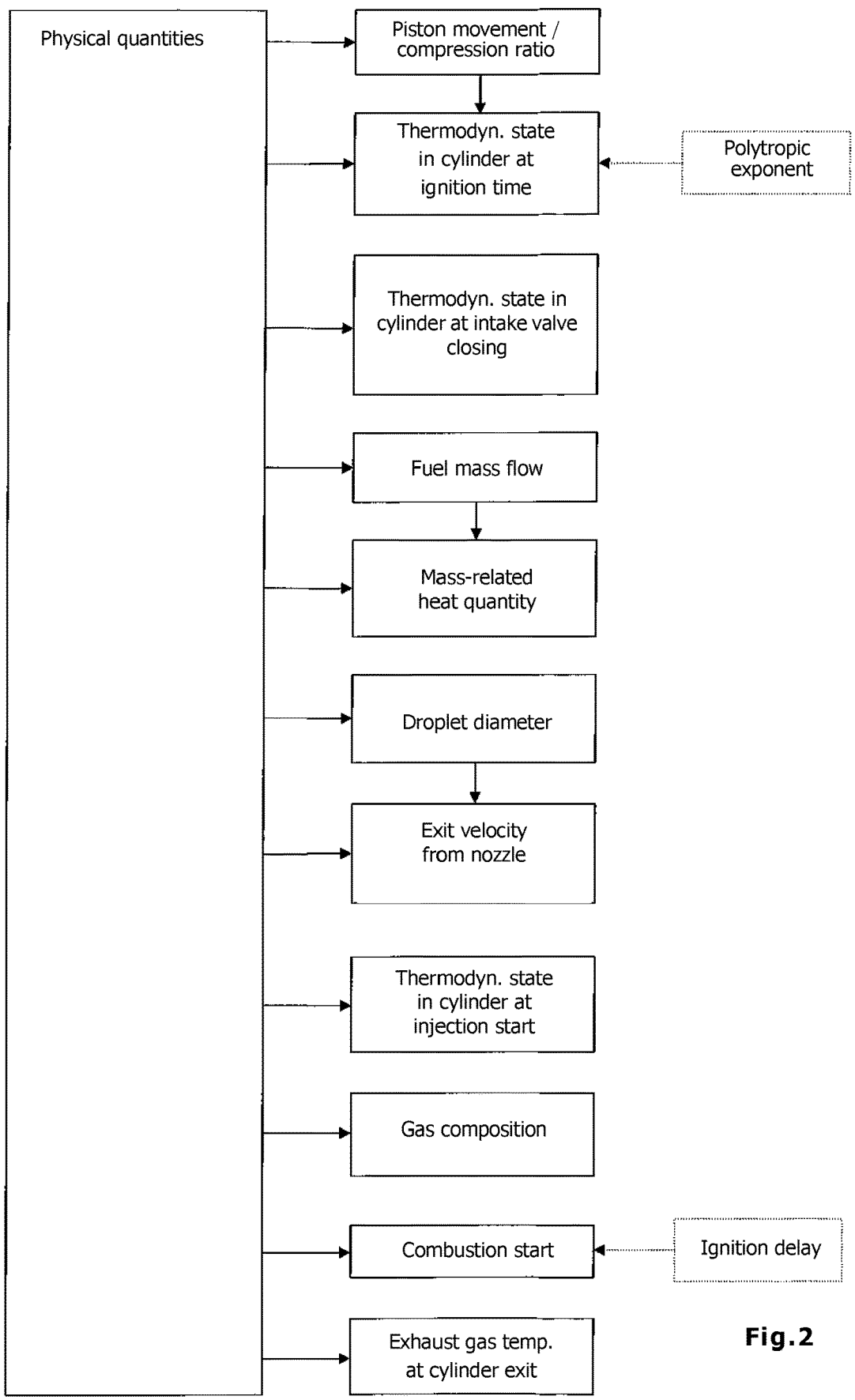
FIG. 2 shows a block diagram to represent the information flow in regard to the physical model in an optimization of a diesel engine.

FIG. 2 represents, purely as an example, dependencies of the physical model (in the middle) on the plurality of physical quantities as well as dependencies among each other in regard to a diesel engine. In the sample embodiment shown here, the polytropic exponent from an empirical model preferably goes into the thermodynamic state in the cylinder as a physical model. Furthermore, the ignition delay goes into the physical model for the combustion start as a second parameter computed by means of an empirical model.

Figure 3:
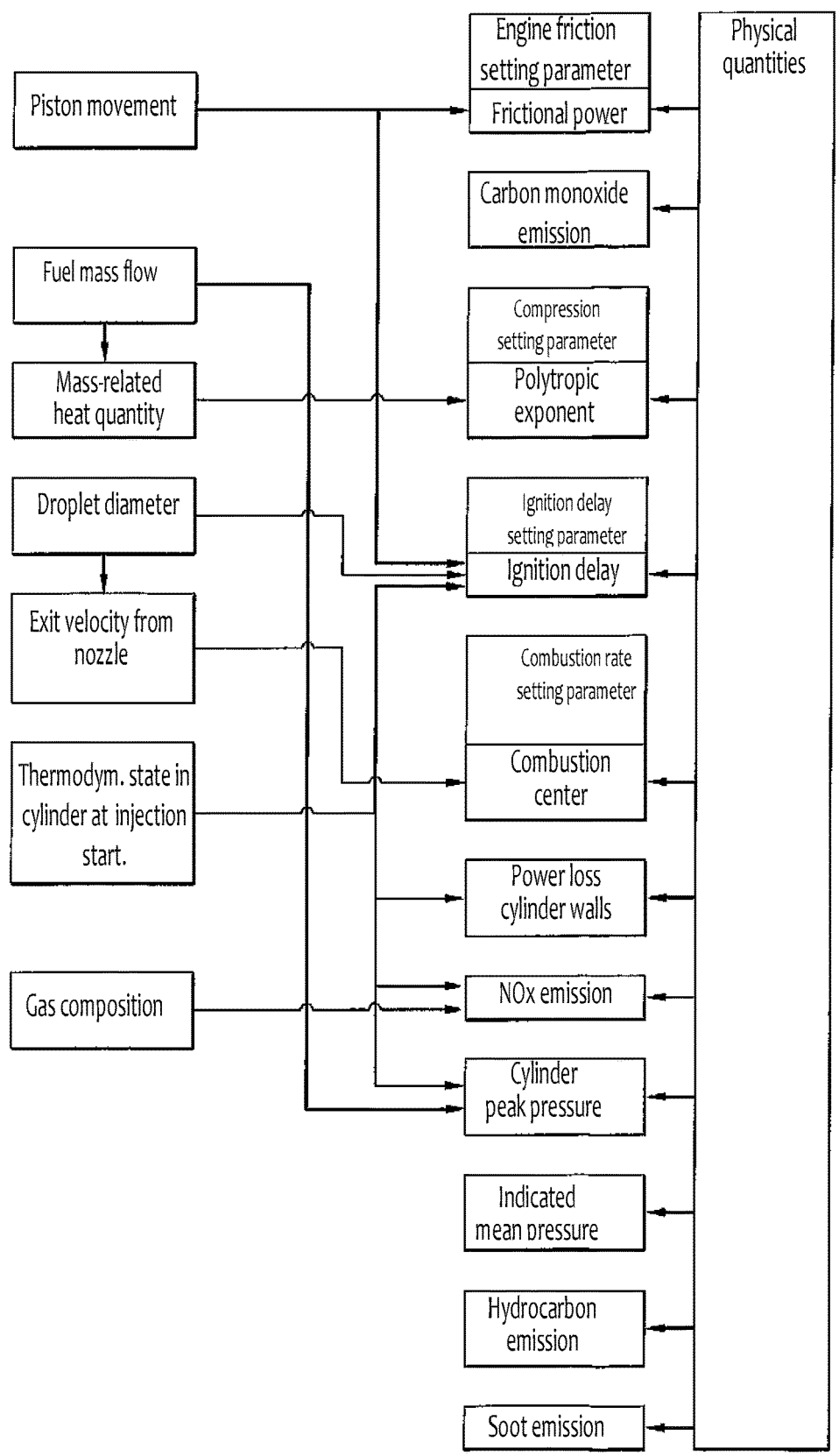
FIG. 3 shows a representation of the information flow in regard to the empirical model in one embodiment of a described method in regard to a diesel engine.

FIG. 3 shows, as an example, dependencies of the empirical model (in the middle) on physical models, at left, and physical quantities, at right, in the case of a diesel engine. Besides the parameters computed with the aid of physical models, a small number of physical quantities also preferably go directly into the empirical model in each case.

Preferably, the piston movement enters into the computation of the ignition delay and the frictional power as an input parameter. The fuel mass flow preferably enters into the computation of the cylinder peak pressure as an input parameter. The mass-related heat quantity preferably enters into the computation of the polytropic exponent as an input parameter. The droplet diameter preferably enters into the computation of the ignition delay and the exit velocity at the nozzle as an input parameter. The exit velocity at the nozzle preferably enters into the computation of the combustion center as an input parameter. The thermodynamic state in the cylinder at injection start preferably enters into the computation of the power loss through the cylinder walls, the ignition delay, the cylinder peak pressure and the nitrogen oxide emission as an input parameter. The gas composition preferably enters into the computation of the nitrogen oxide emission as an input parameter. The compression setting parameter preferably enters into the computation of the polytropic exponent as a further input parameter. The ignition delay setting parameter preferably enters into the computation of the ignition delay as another input parameter. The combustion rate setting parameter preferably enters into the computation of the combustion center as a further input parameter. The engine friction setting parameter preferably enters into the computation of the frictional power as a further input parameter.

Figure 4:
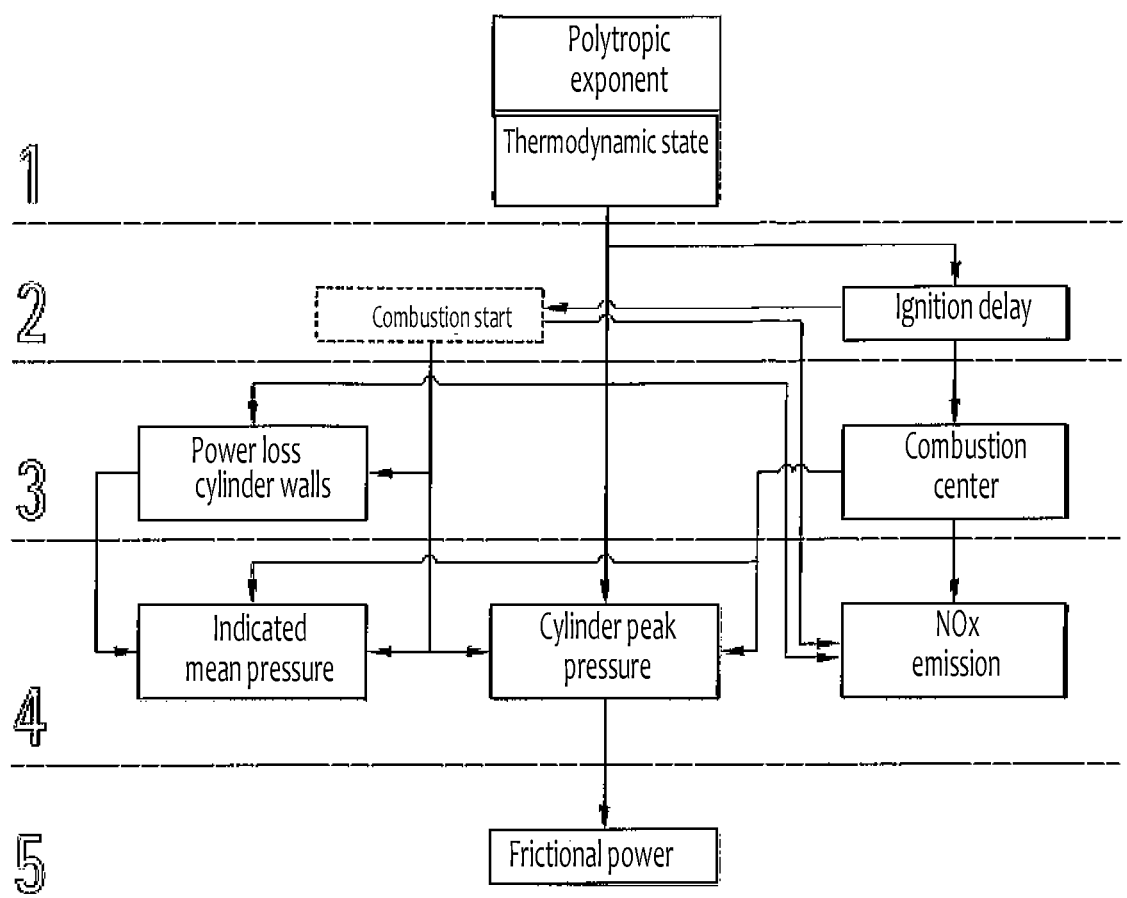
FIG. 4 shows a representation of the information flow between the empirical models of one disclosed embodiment of a disclosed method in regard to a diesel engine.

FIG. 4 shows the cascade-like interdependency of the individual empirical submodels in regard to a diesel engine. One may infer from FIG. 4 that a preferred sample embodiment of the invention, which has proven to be particularly suited to the optimization of a diesel engine, has a five-stage optimization cascade. The combustion start in itself is no empirical model in the proper sense, but it shows that the ignition delay has indirect influence on four other submodels. Neither is the thermodynamic state in the cylinder computed on the basis of an empirical model, but it likewise shows the indirect influence of the polytropic exponent on four other submodels.

The polytropic exponent preferably goes through the thermodynamic state as input parameter into the computation of the ignition delay and the cylinder peak pressure. The ignition delay preferably enters into the computation of the combustion center and, through the combustion start, into the computation of the power loss through the cylinder walls, the indicated mean pressure, the cylinder peak pressure and the nitrogen oxide emission as an input parameter through the cylinder walls. The power loss through the cylinder walls preferably enters into the computation of the indicated mean pressure as an input parameter. The combustion center preferably enters into the computation of the cylinder peak pressure and the nitrogen oxide emission as an input parameter. The cylinder peak pressure preferably enters into the computation of the frictional power as an input parameter.

Figure 5:
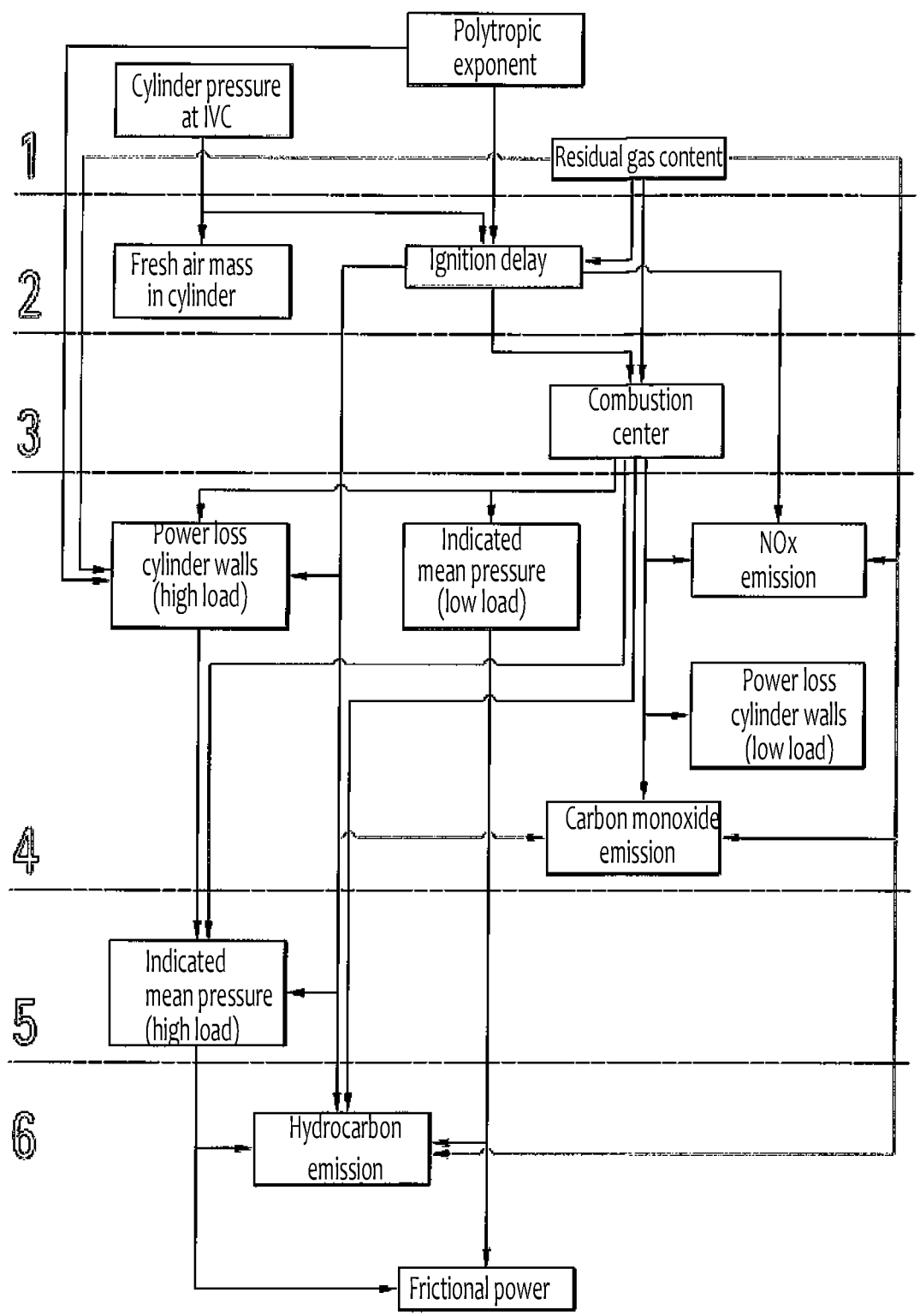
FIG. 5 shows a representation of the information flow between the empirical models of one embodiment of a disclosed method in regard to a gasoline engine.

FIG. 5 shows as an example an embodiment of the cascading of empirical models according to the invention, which has proven to be especially advantageous for the optimization of a gasoline engine. The cascading here preferably has six levels. The polytropic exponent preferably enters into the computation of the ignition delay and the power loss through the cylinder walls as an input parameter. The ignition delay preferably enters into the computation of the combustion center, the power loss through the cylinder walls, the carbon monoxide emission, the indicated mean pressure and the hydrocarbon emission. The residual gas content preferably enters into the computation of the power loss through the cylinder walls, the ignition delay, the combustion center, the nitrogen oxide emission, the carbon monoxide emission and the hydrocarbon emission as an input parameter. The cylinder pressure at IVC preferably enters into the computation of the fresh air mass in the cylinder and the ignition delay as an input parameter. The combustion center preferably enters into the computation of the power loss through the cylinder walls at low and high load, the indicated mean pressure at low and at high load, the hydrocarbon emission, the carbon monoxide emission and the nitrogen oxide emission. The power loss through the cylinder walls at high load preferably enters into the computation of the indicated mean pressure at high load as an input parameter. The indicated mean pressure at low load preferably enters into the computation of the hydrocarbon emission and the frictional power as an input parameter. The indicated mean pressure at high load preferably enters into the computation of the hydrocarbon emission and the frictional power as an input parameter.

Sample Embodiment, Optimization of a Diesel Engine

Input Parameters in the Method

If the method according to the invention is used for the optimization of a diesel engine, the physical quantities used as (first) input parameters can preferably be divided into five categories. These are geometrical data in regard to the internal combustion engine, operating point-relevant data in order to define the respective operating point of the internal combustion engine, air path-relevant data, i.e., data which characterize the air guidance and also the state of the surrounding air. A further category is preferably fuel system-relevant data, defining in particular the injection, and combustion-relevant data, which define the control of the combustion in the particular internal combustion engine.

Physical Model

In the optimization of a diesel engine, the physical relationships used can preferably be divided basically into nine physical models, indicating the fuel mass flow, the gas composition in the cylinder, the mass-related heat quantity, the piston movement, the thermodynamic state in the cylinder, the exit velocity from a nozzle, the droplet diameter, the combustion start and the exhaust gas temperature.

In the following, sample embodiments shall be given for the computation of several of these physical models, at least in broad outline.

Gas Composition in the Cylinder

Knowledge of the correct gas composition in the cylinder, especially the oxygen concentration, is an important factor of influence in computing the nitrogen oxide emission of the charge, for example.

In order to also allow approximately for the influence of the humidity in the models, the oxygen concentration is preferably indicated not only as a function of the EGR rate and the excess air, but also in terms of the humidity.

The oxygen concentration is preferably computed as a function of lambda, EGR rate and humidity, as follows, and will be used afterwards as an input quantity for various models:

$$X_{O2} = f(\lambda, AGR, x)$$

wherein:

$$X_{O2}\left[\frac{m^3}{m^3}\right] = \text{Volume fraction of oxygen}$$

$\lambda[-]$=Excess air $AGR[\%]$=EGR rate $x[-]$=Humidity

Mass-Related Heat Quantity

The mass-related heat quantity designates in particular the chemically bound energy of the particular fuel as related to the total cylinder mass. This parameter is used during the formation of the empirical model for the polytropic exponent as an approximate replacement parameter for the temperature level prevailing during the combustion of the previous cycle. The larger the charge mass for the same fuel quantity, the lower the temperature level. The mass-related heat quantity is computed by the following equation:

$$\dot{q} = \frac{H_u * \dot{m}_{KS}}{\dot{m}_{ges}} \quad \text{equation (I)}$$

wherein:

$\dot{m}_{KS}\left[\frac{kg}{s}\right]$ = Fuel mass flow $\dot{m}_{ges}\left[\frac{kg}{s}\right]$ = Total cylinder mass flow, *incl.* residual gas $H_u\left[\frac{J}{kg}\right]$ = Lower calorific value $\dot{q}\left[\frac{W}{kg}\right]$ = Mass-related heat quantity released Piston Movement The physical model of the piston movement basically consists of three submodels, which specify the mean piston velocity, the piston velocity at injection start and the compression ratio in the cylinder volume at injection start.

The mean piston velocity is preferably computed as an input quantity for the model to compute the engine friction as follows:

$$v_m = \frac{n \cdot s}{30000}$$

wherein:
n[1/min]=Rotational speed
s[mm]=Stroke $v_m\left[\frac{m}{s}\right]$ = Mean piston velocity The piston velocity is likewise an input parameter in at least one empirical model. It is computed by the following formula:

$$v_{kEB} = 2 \cdot \pi * n * r \cdot \left(\sin \varphi_{EB} + \frac{r}{2 \cdot l} \cdot \sin 2\varphi_{EB}\right)$$

wherein:
r[m]=Crank radius
l[m]=Connecting rod length $v_{kEB}\left[\frac{m}{s}\right]$ = Piston velocity at injection start $\varphi_{EB}$[° K.W]=Crank angle at injection start Thermodynamic State in the Cylinder The effective compression ratio, which is needed in particular to compute the thermodynamic state in the cylinder, is computed by the following formulas:

$$\varepsilon = \frac{V_h + V_c}{V_c}$$

or $$V_c = \frac{V_h}{(\varepsilon - 1)}$$

wherein:
$V_h$[m³]=Displacement of a cylinder
$V_c$[m³]=Compression volume of a cylinder
$\varepsilon$[−]=Compression ratio If the compression volume is known, cylinder volume and effective compression ratio at the start of the main injection can be calculated. The cylinder volume is needed in order to compute the temperature under the assumption of an ideal gas by means of the ideal gas equation at injection start:

$$s_{kEB} = r \times \left[1 + \frac{1}{r} - \cos \varphi_{EB} - \sqrt{\left(\frac{1}{r}\right)^2 - \sin^2 \varphi_{EB}}\right]$$

$s_{kEB}$[m] = Piston travel at injection start $$V_{hEB} = \frac{d^2 \cdot \pi}{4} \cdot s_{kEB}$$

wherein:
$V_{h_{EB}}$[m³]=Displacement at injection start
d[m]=Bore $V_{TotalEB} = V_{h_{EB}} + V_c$ $V_{TotalEB}$[m³]=Cylinder volume at injection start This yields the following for the effective compression ratio at injection start:

$$\varepsilon_{EB} = \frac{V_h + V_c}{V_{hEB} + V_c}$$

$\varepsilon_{EB}$[−] = Effective compression ratio at injection start

The thermodynamic state in the cylinder, hereinafter represented at injection start, is defined by pressure and temperature. For a known volume at injection start, the mass in the cylinder can be computed from the measured air mass as well as the measured EGR rate assuming an ideal load exchange without flushing and with constant residual gas content. By transforming the gas equation and assuming an ideal gas, one obtains the formal relationship for the temperature at injection start as follows:

$$T_{Zyl\_EB} = \frac{p_{Zyl\_EB} * V_{TotalEB}}{m * R}$$

wherein:
$p_{Zyl\_EB}$[Pa]=Pressure at injection start
$T_{Zyl\_EB}$[K]=Temperature at injection start
m[kg]=Total mass in the cylinder $R\left[\frac{J}{kgK}\right]$ = Ideal gas constant In order to properly reflect the effects of different flow rates of the injection nozzle for different numbers of injection orifices on the individual internal combustion engines, specific quantities are used. The characteristics of the injection jet are described by the fuel exit velocity from the nozzle and the droplet diameter. These are preferably computed in accordance with the pressure in the cylinder, the injection pressure and the orifice diameter according to the following formulas. The fuel exit velocity from the nozzle is computed as approximately loss-free by the Bernoulli equation for an incompressible stationary flow:

$$v_{Aus} = \sqrt{\frac{2 \cdot (p_{Rail} - p_{Zyl\_EB})}{\rho_{KS}}}$$

wherein:
$p_{Zyl\_EB}$[Pa]=Cylinder pressure at injection start
$p_{Rail}$[Pa]=Fuel injection pressure $$\rho_{KS}\left[\frac{kg}{m^3}\right] = \text{Fuel density}$$

$$v_{Aus}\left[\frac{m}{s}\right] = \text{Exit velocity}$$

Droplet Diameter

For the computation of the droplet diameter, the nozzle orifice diameter is required, which is determined with the aid of the effective nozzle orifice area. The value for a typical flow coefficient for the nozzle orifices is preferably determined by means of an assumption, wherein the nozzle orifice area and the nozzle orifice diameter are preferably computed as follows.

$$A_{eff\_DL} = \frac{\dot{V} \cdot \rho_{KS}}{n_{DL} \cdot \sqrt{2 \cdot \rho_{KS} \cdot (p_{Rail} - p_{Zyl\_EB})}}$$

wherein:
$A_{eff\_DL}$=Area of nozzle orifice $$\dot{V}\left[\frac{m^3}{s}\right] = \text{Nozzle flow rate per manufacturer}$$

$n_{DL}$[−]=Number of nozzle orifices
From this:

$$A_{DL} = \frac{\dot{V} \cdot \rho_{KS}}{\alpha_{DL} \cdot n_{DL} \cdot \sqrt{2 \cdot \rho_{KS} \cdot (p_{Rail} - p_{Zyl\_EB})}}$$

wherein:
$A_{DL}$[m³]=Effective flow cross section or nozzle orifice diameter
$\alpha_{DL}$=Flow coefficient
From this:

$$d_{DL} = \sqrt{\frac{4}{\pi} \cdot A_{DL}}$$

$d_{DL}$[m] = Nozzle orifice diameter

Finally, the droplet diameter is computed as follows:

$$d_T = \frac{12.392 \cdot d_{DL}^{0.44} \cdot \rho_{KS}^{0.42} \cdot (\sigma_{KS} \cdot \upsilon_{KS})^{0.28}}{(p_{Rail} - p_{Zyl\_EB})^{0.42} \cdot \rho_L^{0.28}}$$

$d_T$=Droplet diameter
$d_{DL}$[m]=Nozzle orifice diameter $$\rho_{KS}\left[\frac{kg}{m^3}\right] = \text{Fuel density}$$

$$\sigma_{KS}\left[\frac{kg}{s^2}\right] = \text{Surface tension of the fuel}$$

$$\upsilon_{KS}\left[\frac{m^2}{s}\right] = \text{Kinematic viscosity of the fuel}$$

$$\rho_L\left[\frac{kg}{m^3}\right] = \text{Charge density at injection start}$$

$p_{Zyl\_EB}$[kPa]=Cylinder pressure at injection start
$p_{Rail}$[kPa]=Fuel injection pressure
$d_T$[m]=Mean droplet diameter
Empirical Model:

In the optimization of a diesel engine with the method according to the invention, a cascade of empirical submodels of section C in FIG. 1 preferably contains eleven different empirical models and five cascade stages, as represented in FIG. 4. If the frictional power, which does not belong to the original combustion process, is excluded, then a combustion process can basically be completely simulated by six empirical submodels in only four cascade stages.

In the following, it shall be explained for some of these empirical models which input parameters enter into them. The input parameters here may be divided substantially into three groups: physical quantities, which enter directly into the empirical model, parameters which are computed by means of physical models, and parameters which are computed by means of other empirical models, and optionally machine-specific setting parameters. These are preferably introduced, since in many instances a correction of the model outputs performed solely via factors or constants is not advisable. The setting parameters are preferably established by physically-based effects, yet these are difficult to allow for on account of their complexity. One example is the interaction between the injection jet and the piston bowl during combustion.

Figure 6:
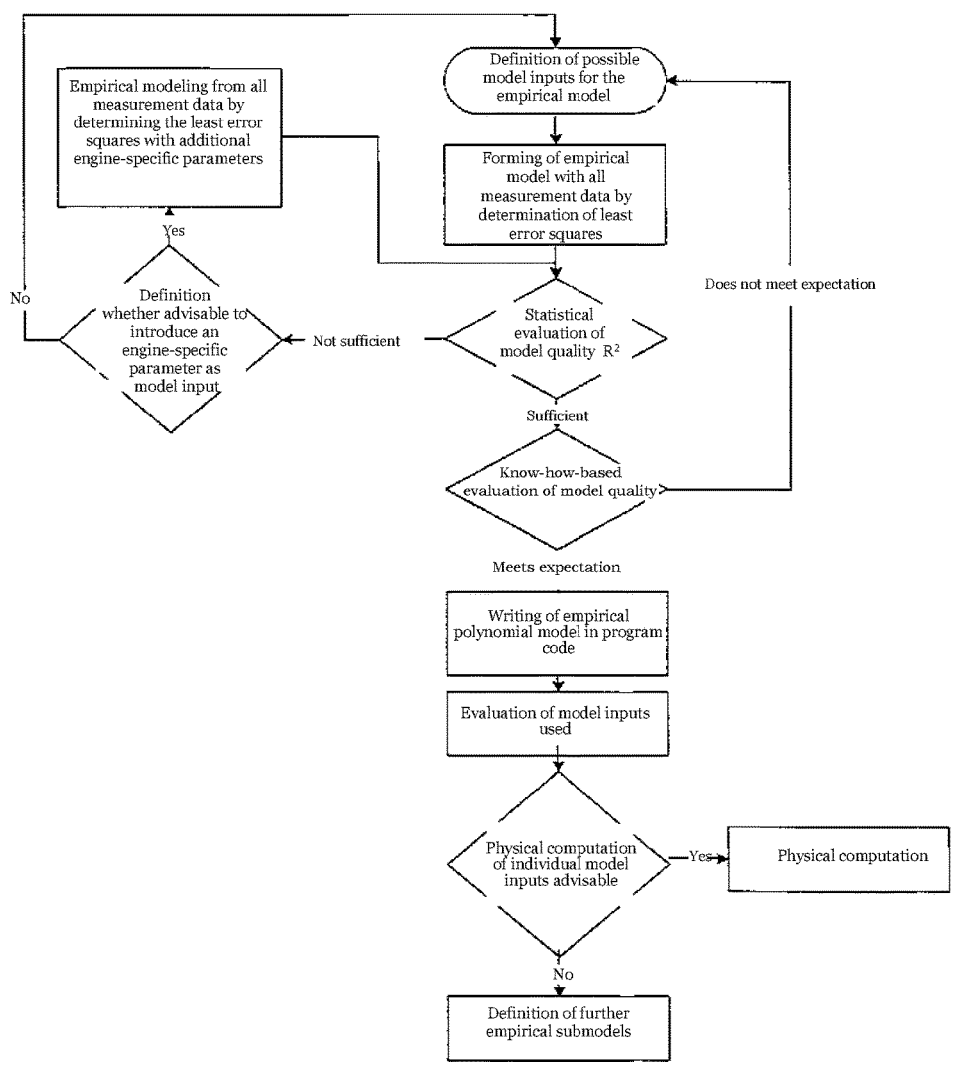
FIG. 6 shows a flow chart for the creation of a model forming the basis of a disclosed method.

A sample creation of physical models shall be explained in the following with reference to FIG. 6. When creating the empirical model, one first tries to compute as many input parameters as possible through physical models, in order to keep down the numbers of inputs into the empirical model. This increases the general validity of the method of optimization, since the number of empirical submodels based on experiments with other internal combustion engines can be kept as low as possible. Furthermore, all input parameters of the empirical models are preferably chosen so that all the internal combustion engines studied can be simulated with identical parameters.

In a first step, measurement data from a set of different previously-calibrated engines, preferably with the same combustion process (different sets for diesel engines and gasoline engines) and similar engine geometry is recorded during test stand trials. For example, a set of diesel engines may comprise nine different engines with displacements ranging from 0.5 L/cylinder to 2.5 L/cylinder. A suitable number of measurement points to create the empirical model is around 10,000 measurement points, with each measurement point, preferably defined by rotational speed and torque, comprising a multiplicity of quantities of measurement. In a second step, the model outputs needed for the optimization are defined which cannot already be computed by physical models, such as nitrogen oxide emissions, power, exhaust gas temperature, etc. For each of these model outputs, empirical models are created, preferably by means of regression analysis, e.g., on the basis of polynomial model techniques. One preferably uses second-order polynomial models for this. The coefficients of this regression model are preferably formed by determining the least error squares. The models basically have the following structure:

$$y = x_1 \cdot u_{1,trans}^2 + x_2 \cdot u_{2,trans}^2 + \ldots + x_{1,2} \cdot u_{1,trans} \cdot u_{2,trans} + \ldots + c \quad (I)$$

The model inputs are transformed by the following equation (Student's transformation).

$$u_{i,trans} = \frac{Var_i - \overline{Var_i}}{\sigma_{Var}}$$

wherein:
$u_{i,trans}$=Transformed model input
$Var_i$=Model input
$\overline{Var_i}$=Mean value of all measurement values of this model input
$\sigma_{Var}$=Standard deviation of the measurement values of this model input By the transformation of the model inputs, all model coefficients have the same order of magnitude—and therefore the size of the coefficients provides information as to its influence on the model output. The larger the coefficient, the greater its influence. This can advantageously be used to determine the important model inputs. The coefficients $x_1$, $x_2$, $x_{1,2}$ are determined such that all engines of the particular set can be modeled with the same coefficients.

In order to compute the behavior of different engines with the same coefficients $x_1$, $x_2$, $x_{1,2}$, the model inputs $u_1$, $u_2$ are made comparable. In particular, the model inputs are normalized for this by a physical conversion to engine-independent quantities. For example, the respective displacement value of the individual engines may be used as a normalization factor.

A preferably empirical model for the computation of volume-specific indicated high-pressure performance is presented below. First of all, the model inputs are transformed and then the volume-specific high-pressure performance is computed. The variables A through K represent the transformed model coefficients.

vol. spec. fuel efficiency_trans=(vol. spec. fuel efficiency−47.6)/24.3
combustion start HE_trans=(combustion start HE−(−1.6))/5.1
burn-through duration_trans=(burn-through duration−17.7)/5.0
vol. spec. wall heat flux_trans=(vol. spec. wall heat flux−8.1)/4.1
Vol. spec. indicated high-pressure performance=vol. spec. fuel efficiency_trans ^2*A+combustion start HE_trans ^2*B+burn-through duration_trans ^2*C+vol. spec. fuel efficiency_trans*combustion start HE_trans*D+vol. spec. fuel efficiency_trans*vol. spec. wall heat flux_trans*E+combustion start HE_trans*burn-through duration_trans*F+combustion start HE_trans*vol. spec. wall heat flux_trans*G+burn-through duration_trans*vol. spec. wall heat flux_trans*H+vol. spec. fuel efficiency_trans*I+combustion start HE_trans*J+burn-through duration_trans*K+vol. spec. wall heat flux_trans*L+const The model quality of the obtained empirical models is preferably statistically evaluated in a further step, especially by computing its coefficient of determination. If an adequate model quality is found, the plausibility of the models is once again verified, as explained below. If no adequate model quality is found, a verification is done to see whether the model quality can be improved to a satisfactory level by introducing an engine-specific setting parameter EP as a further model input. If so, then a setting parameter EP is added to the empirical model.

If the model quality or the coefficient of determination cannot be significantly enhanced by an engine-specific setting parameter EP, the choice of the model inputs and/or the mathematical formulation of the model approach must be reviewed. One will preferably use additional and/or different model inputs to form the empirical model. By the definition of a setting parameter EP as an additional model input, some of the empirical models used can be adapted to become engine-specific. By means of the setting parameter EP, engine-specific properties can be taken into account. These properties result, for example, from physical effects, such as the engine-specific interaction between injection jet and piston bowl or the behavior of the injection jet in accordance with the nozzle orifice geometry. Empirical polynomial models will then have the following form, for example:

$$y = x_1 \cdot u_{1,trans}^2 + x_2 \cdot u_{2,trans}^2 + x_{1,2} \cdot u_{1,trans} \cdot u_{2,trans} + \ldots + x_3 \cdot EP + c \quad (II)$$

The use of the setting parameters as an additional model input in the polynomials has the major benefit that interactions of setting parameter and model input parameter can occur, and the setting parameters are thus not merely offsets or factors. They enable a simple adjustment of the model to new engines for the optimization method according to the invention. Due to the low mathematical complexity of this model, particularly fast computing times can be realized.

In a following plausibility evaluation of the obtained empirical models, the model dependencies of the individual parameters are investigated in particular, wherein the directions of action must preferably be in harmony with known phenomena from the literature or in harmony with experience from already-performed optimizations. If the plausibility evaluation reveals that the model output does not change upon varying one or more model inputs, as is known from the literature or in line with experience, the inputs or the formulations of the empirical models themselves will once again preferably be changed.

When a satisfactory model quality is finally achieved, one will investigate whether the model inputs used can be determined directly from known parameters or whether another upstream submodel needs to be used for the determination of the model inputs. This may be physical or generically empirical.

The creation of a generic semi-physical combustion model according to the invention is complete if the combustion model only has model inputs whose values are known or given, such as parameters which are conditioned by the design of the internal combustion engine or dictated by its control system. With this, the creation of the model is complete.

Parametrization of the Combustion Model for the Engine being Optimized

As the starting value for the setting parameters in an engine being optimized, one will preferably use the arithmetic average of the setting parameters used for the individual engines 1, 2, 3 during the creation of the model. For the further adaptation of the setting parameters to the machine being optimized, at least one measurement point is needed, consisting of various measurement quantities. For each empirical model having a setting parameter as its model input, a comparison is then performed between computed and measured value, and the setting parameter is adapted so that the deviation between measurement and computation is minimal. On the other hand, it is not necessary to re-determine the coefficients $x_1$, $x_2$, $x_{1,2}$.

In the following, for the presented sample embodiment of an optimization method for a diesel engine we shall describe nine different empirical models with their input parameters which have proven to be especially suited to describing the combustion process in diesel engines, namely, empirical models for the polytropic exponent, the ignition delay, the combustion center, the power loss through the cylinder walls or the wall heat flux, the induced [sic; written as "indicated" elsewhere in the document—Tr.] mean pressure of the high-pressure loop, the frictional power, the cylinder peak pressure, the nitrogen oxide emissions and the soot emissions.

Polytropic Exponent

The thermodynamic state in the cylinder at injection start, and thus the polytropic exponent, has an influence on the ignition delay, the temperature level and the peak pressure of combustion. Therefore, a computation of temperature and pressure at injection start is indispensable. These depend decisively on the heat transfer during compression, the compression ratio as well as the pressure and temperature at compression start and therefore the state in the intake manifold. The determination of the exact temperature upon closing of the intake valve can only be done with difficulty, since even slight discrepancies in the measured cylinder pressure mean a large error for the temperature. However, the indication is calibrated for the measurement of high cylinder pressures, which worsens the measurement quality for low ones. The pressure at injection start is therefore computed directly from the pressure in the intake manifold and not from the pressure at intake valve closure. The effects of incoming flow through the valves, as already mentioned, are factored in through the compression setting parameter.

Due to the computing time required, crankshaft angle-resolved approaches cannot be used for the computing of the wall heat losses in the channels and during compression. The compression of a combustion engine is a polytropic state variation, and for this reason an empirical model for the polytropic exponent of the polytropic relation is created for calculating the pressure at injection start. A larger polytropic exponent means a higher pressure at the end of the compression.

For the most physical possible simulation, the assumption of a constant polytropic exponent is unsuitable, since the temperature would then be equal to 10° KW before upper dead center and 10° KW after upper dead center. In reality, both temperature and pressure are lower after the upper dead center due to the larger wall heat losses, which the model takes into account.

The choice of the input parameters for a preferred empirical model for the polytropic exponent is done preferably as follows. The heat transfer during compression influences the charge state at injection start and therefore the polytropic exponent. The heat flux can be described by the following relation:

$$\dot{Q} = \alpha * A * \Delta T * \Delta t$$

wherein:
$\dot{Q}[W]$ = Heat flux $\alpha \left[ \dfrac{W}{m^2 \cdot K} \right]$ = Heat transfer coefficient $A[m^2]$ = Area
$\Delta T[K]$ = Temperature difference
$\Delta t[s]$ = Time increment From this it is evident that the heat flux at $\Delta t \rightarrow 0$ likewise tends toward zero. Therefore, with increasing rotational speed, the heat transfer must become less and the polytropic exponent must thus become larger. At constant rotational speed, the injection time as already mentioned likewise has an influence on the time $\Delta t$ available for the heat transfer. For this reason, the polytropic exponent also increases with very early injection starts. The first two preferred parameters of the model for the polytropic exponent emerge from these considerations, namely, rotational speed and injection start.

Furthermore, the compression results in higher gas temperatures than the surface temperatures of the combustion chamber walls. For this reason, the wall heat loss increases due to a higher intake manifold temperature and the resulting larger temperature difference, which thereby decreases the polytropic exponent. Therefore, the intake manifold temperature is also preferably defined as an input quantity.

The surface temperature level on the one hand is preferably factored in as a further input quantity by the mass-related heat quantity released, which is computed by equation (I). On the other hand, this is factored in by a polytropic exponent setting parameter, which is introduced into the empirical model. This setting parameter is integrated directly into the empirical model for the polytropic exponent and simulates different wall heat losses during the compression as well as flow losses in the channels and/or blow-by effects. The thermodynamic state at injection start, furthermore, is not calculated with the effective compression ratio as of intake closure, but instead with the compression starting from the lower dead center. This error is likewise compensated with the polytropic exponent setting parameter.

Ignition Delay

The ignition delay influences the course of the combustion through the time available for the mixture preparation. Therefore, the fraction of the premix combustion as well as the combustion duration until combustion center depend decisively on the ignition delay. While the ignition delay at high load can be estimated shortly and somewhat easily, this is more difficult in the partial load range. The computed ignition delay is likewise important for an estimation of ignition misfires, which cannot be computed directly with a mean value model. If the computed ignition delay exceeds a limit of around 3 milliseconds, it can be assumed that the introduced fuel quantity is no longer fully burned.

The ignition delay is preferably defined as the time difference between injection start and combustion start. The ignition delay model created here outputs this in crank angle degrees. For a correlation with the time difference, and also as a measure of the turbulence in the combustion chamber at injection start, rotational speed is preferably an input parameter in an empirical model for the ignition delay. An important influence parameter on the ignition delay is the gas temperature prevailing in the cylinder during fuel injection. The higher this temperature, the more quickly the fuel is evaporated and self-ignition can commence. Therefore, the gas temperature in the cylinder is also preferably an input parameter.

The quality of the mix preparation, and thus the droplet size, likewise has an influence on the ignition delay. Smaller droplet diameters increase the ratio of surface to volume, which accelerates the evaporation of the fuel and thus the self-ignition. Therefore, the droplet diameter is also preferably an input parameter.

Lower oxygen concentration in the cylinder due to exhaust gas recirculation delays the start of combustion. In reality, however, a shortening of the ignition delay may be observed upon increasing the EGR rate. This is due to the fact that higher rates of exhaust gas recirculation usually involve a raising of the temperature level, which may have greater influence than the lower oxygen concentration. Therefore, the oxygen concentration is also preferably an input parameter.

Another influence factor is the temporal change in the state within the cylinder at the start of the fuel injection. Whereas the ignition conditions improve up to the upper dead center for an injection prior to the upper dead center, the ignition conditions become worse with increasing crank angle for an injection after the upper dead center. The higher the rotational speed, the more quickly the state changes. In a computation of the ignition delay resolved into crankshaft angles, this is factored in by integrating the individual time increments. As a replacement quantity for this, the invention proposes preferably using the piston velocity at start of injection as an input parameter.

Spray break-up is also dependent on the injection nozzle orifice geometry, besides the state prevailing in the cylinder. A detailed computation of the jet preparation is not possible without a multizone model and this in turn is not expedient for the application according to the sample embodiment, once again due to computing time factors. Therefore, the influence of spray break-up upon exiting the injection nozzle is adjusted by the setting parameter for the ignition delay. Fuel properties such as cetane number or boiling behavior, as well as differences in the edges of the injection curve, can also preferably be handled with the ignition delay setting parameter.

Combustion Center

The combustion center is a parameter often used in the development of combustion engines to characterize combustion. In order to ensure the practical utility of the combustion model, the combustion center should preferably be determined. Furthermore, this is an intermediate result on which other parts of the combustion model are preferably built.

The first phase of combustion generally remains almost unaffected by charge pressure. This means that the air ratio 2, has only a slight influence on the location of the combustion center. However, this is not true of the entire duration of the combustion, which indeed is influenced by the air ratio. A higher air ratio results in a shorter overall combustion duration. In terms of the combustion curve, what is preferably calculated is not the combustion center directly, but rather the combustion duration from combustion start to combustion center. This is computed here, analogously to the ignition delay, in crank angle degrees. The engine rotational speed is therefore preferably the first input parameter and is a measure of the turbulence generated by the charge exchange.

One of the greatest influences on the duration of the diffusion combustion is the injection duration itself, since the rate of diffusion combustion depends not on the rapidity of chemical reaction but instead on the mixture preparation processes—and it is therefore preferably the second input parameter. This is an important quantity during injection, and the gas composition recedes into the background.

In the case of premixed combustion, contrary to diffusion combustion, the combustion rate depends not on the mixing processes of the spray, but purely on the chemical reaction rate. This, in turn, is a function of the thermodynamic state and the gas composition in the cylinder. Especially for the primarily premixed combustion of the partial load, the injection duration is less significant and the gas composition is more important. The fraction of the premixed combustion and the burn-through duration depend accordingly on the ignition delay, which is therefore preferably one of the input parameters.

The mixture preparation processes are to a large extent determined by the energy introduced by the spray and the droplet size. For this reason, the exit velocity of the fuel from the nozzle is preferably used as a further input parameter. A higher exit velocity, for constant injection duration, leads to a faster combustion.

The EGR rate and thus the oxygen concentration likewise have influence on the burn-through duration. Because of the exhaust gas recirculation, the oxygen availability is less and the combustion is slower. Therefore, the oxygen concentration is also preferably an input parameter.

The burn-through duration depends not only on the gas state in the cylinder (such as the EGR rate), but also on the combustion chamber geometry and the interaction of the combustion chamber with the injected spray. Different combinations of combustion chamber and nozzle differ in their burn-through rate, which has an impact on emissions and the efficiency of the combustion engine (e.g., interaction of the injected spray with the piston bowl). This influence, precisely like differences in the injection course or the spray cone angle, is preferably simulated with the combustion center setting parameter, since the interaction cannot be computed in a 0-dimensional model. The parameter is preferably integrated directly into the model in order to properly reflect various effects depending on the operating point.

The post-injection of fuel has the result of shifting the combustion center in the late direction. The shift is determined by the difference between measured and computed combustion center for the main injection and is modeled thereafter. Input parameters in the model for the combustion center shift are preferably the combustion duration of the first part of the main combustion, the rotational speed and the specific fuel quantity of the post-injection.

Wall Heat Flux

The computation of the quantity of heat given off across the combustion chamber walls, i.e., the power loss through the cylinder walls or the wall heat flux, is necessary in order to compute the indicated mean pressure of the high-pressure loop, for example in a subsequent model. The model output is preferably a specific or normalized quantity of heat in kW per liter of displacement.

According to the fundamental principle of an internal combustion engine, the magnitude of the energies given off as power, exhaust gas enthalpy, and wall heat flux is dependent on the volume-specific fuel efficiency which is introduced, [which is] preferably the first input parameter of the empirical model. The ratio of surface to volume is critically responsible for the efficiency of an internal combustion engine. Large engines have distinctly higher efficiency than small passenger car diesel engines. This is due, among other factors, to reduced heat transfer in large-volume engines on account of the smaller ratio of surface to volume. In order to compute the combustion of passenger car engines with the same empirical model as used for large utility vehicle engines, the surface to volume ratio is therefore preferably another input parameter.

The wall heat flux depends not only on the surface and heat transfer coefficient, but also on the temperature difference between gas and combustion chamber wall. Therefore, in this mean-value combustion model, the temperature level is of critical importance. This depends not only on the position of the combustion but also on the mass-related heat quantity. The same fuel quantity for different charge masses in the cylinder results in different levels of combustion temperatures. Hence the influence of lambda on the wall heat transfer, which consequently also preferably comes in as an input parameter. Greater air excess for the same EGR and fuel mass flow results in lower wall heat losses. For mathematical reasons, it is well to use the reciprocal of lambda, in order to avoid values tending toward infinity.

The area of the cylinder at the time of the maximum mean combustion chamber temperature likewise has an influence on wall heat losses. This temperature has its maximum shortly after the combustion center. Since its position is known, the area of the cylinder at the combustion center (MFB50%) is preferably used as an input parameter in order to compute the influence of the area on the wall heat losses. A rise in the EGR rate with lambda remaining constant is associated with an increase in the charge mass. This increase and the change in the material properties alter the wall heat flux. Therefore, the EGR rate is also preferably an input parameter.

An earlier position of the combustion raises peak temperature, which is associated with an increase in the temperature difference. The duration of the heat transfer across the combustion chamber wall is also longer when the injection time is earlier. For this reason, an earlier injection start results in an increase in wall heat losses. Therefore, the combustion start is also preferably an input parameter.

A raising of the temperature at injection start with other boundary conditions being equal is associated with a raising of the temperature level during combustion, which in turn leads to greater wall heat losses. Therefore, the temperature at injection start is also preferably an input parameter.

It is not possible to determine post-injection wall heat losses directly from the measurement results. The wall heat losses of the main injection, however, can be computed with the previously-described model. The difference between wall heat flux computed from the main injection and that determined from the measurement data with post-injection yields the wall heat losses caused by the post-injection. Measured in terms of the introduced fuel energy, only a very slight portion is lost through the cylinder wall. The following input parameters are preferably used in the empirical model for the wall heat losses of the post-injection: the volume-specific fuel efficiency of the post-injection and the injection start of the post-injection.

The transformation of the chemically bound fuel energy into the power of the high-pressure loop, together with the charge exchange work and the engine friction, is responsible for the effective engine power. The charge exchange work is computed by a charge exchange model, which will not be further discussed here, and may therefore be taken as given. The engine friction has its own empirical model.

Indicated Power of the High-Pressure Loop

In order to describe a preferred model of the indicated power of the high-pressure loop, one may start with the first law of thermodynamics:

$$-p\frac{dV}{d\varphi} + \frac{dQ_B}{d\varphi} - \frac{dQ_W}{d\varphi} + h_E\frac{dm_E}{d\varphi} - h_A\frac{dm_A}{d\varphi} - h_A\frac{dm_{Leck}}{d\varphi} = \frac{dU}{d\varphi}$$

wherein:

$$V[m^3] = \text{Volume}$$

$$\frac{dQ_B}{d\varphi}\left[\frac{J}{°KW}\right] = \text{Transformed fuel energy}$$

$$\frac{dQ_W}{d\varphi}\left[\frac{J}{°KW}\right] = \text{Wall heat loss}$$

$$h_{E,A}\left[\frac{J}{kg}\right] = \text{Specific inlet and outlet enthalpy}$$

$$\frac{dm_{E,A}}{d\varphi}\left[\frac{kg}{°KW}\right] = \text{Mass flow, inlet and outlet}$$

$$\frac{dm_{Leck}}{d\varphi}\left[\frac{kg}{°KW}\right] = \text{Mass flow leakage}$$

$$U[J] = \text{Internal energy}$$

Accordingly, one gets the following relation for the work of volume change of a combustion cycle, disregarding leakage and the energy supplied through the intake $$p\frac{dV}{d\varphi} = \frac{dQ_B}{d\varphi} - \frac{dQ_W}{d\varphi} - h_A\frac{dm_A}{d\varphi}$$

This gives us the input parameters for the model for the indicated power of the high-pressure loop. The fuel energy introduced into the combustion chamber is primarily responsible for the useful power delivered by the internal combustion engine, given that the introduced fuel energy has by far the greatest influence on the indicated power. Therefore, the volume-specific fuel efficiency at injection start is preferably an input parameter. Furthermore, one can see from the above equation that a reduced wall heat loss results in a higher fraction of useful introduced fuel energy. Therefore, the volume-specific wall heat flux at injection start is preferably an input parameter.

Besides these two model input quantities, the position of the combustion and its duration also have an influence on the indicated volume-specific power. The later the combustion and the longer the transformation lasts, the greater the specific enthalpy released through the exhaust gas. This results in a reduction of the indicated power. Hence, we get the last two preferred input quantities in the model for computing the volume-specific high-pressure power, namely, the combustion start and the duration of combustion until the combustion center.

It must also be considered for the indicated power that the post-injection, due to its possibly late position in order to raise the temperature or hydrocarbon emissions, cannot burn with the same efficiency as the main injection. For this reason, it is important to explicitly model the indicated power of the post-injection. This model is far from being as complex as that of the main combustion, yet it takes account of the significant influences.

The determination of the indicated power of the post-injection is likewise done by forming the difference between measured indicated high-pressure power and that computed for the main injection. The following input parameters are preferably used, analogously to the heat flux model of the post-injection: volume-specific fuel efficiency of the post-injection and injection start of the post-injection. A major influence on the indicated power caused by the post-injection is that of the burning fuel quantity introduced; here as well, the unburnt fraction must be subtracted, of course. Its degree of thermodynamic efficiency will depend for the most part on its position relative to the upper dead center. A late injection, analogous to the main injection, has less power.

Engine Friction

While the engine friction does not pertain directly to the combustion process, it is necessary for computing the engine power output. The engine friction depends greatly on the operating state. Besides rotational speed, the load also has influence on the engine friction, through the gas force which is directly dependent on it. The friction model preferably has only two input parameters. Since passenger car and utility vehicle engines have different rotational speeds, the rotational speed is not a suitable input for the friction model. Consequently, in order to compute the friction, the indirect piston velocity, which is comparable regardless of engine type, is preferably used as an input parameter. As a load dependency, the cylinder peak pressure is preferably used as input parameter, since this stands in direct relation to the maximum gas force. Since the engine friction is largely dependent on structural variables, the number and dimension of the main bearings, the oil, water, and fuel pumps, and the piston/ring pack generally have great influence on the power loss. This is preferably factored in through the setting parameter for the power loss.

Cylinder Peak Pressure

For the mechanical strain on a diesel engine, the cylinder peak pressure is of great importance. For this reason, an empirical model is also preferably produced for this. For a given compression ratio, with fuel quantity and injection time held constant, the charge pressure is critically responsible for the pressure level during the combustion. But in order to also simulate differences in the compression ratio, the pressure at injection start of the main injection is preferably used as input parameter for computing the cylinder peak pressure. The pressure increase due to the combustion is influenced by the position of the combustion and by the supplied fuel quantity. At constant fuel quantity, combustion start and the burn-through duration dictate the pressure increase. An earlier combustion or a rapid burning rate, as is known, bring about a rise in the combustion peak pressure. Therefore, combustion start and burn-through duration are also preferably input parameters.

The change in the fuel mass, other boundary conditions being equal, has an almost linear influence on the cylinder peak pressure. By increasing the introduced fuel energy, the temperature level and thus the peak pressure are also increased, of course. Therefore, the specific fuel mass is also preferably an input parameter.

Nitrogen Oxide Emission

In the diesel engine, nitrogen oxide emission and soot emission are the most objectionable pollution components. Their reduction is of great importance in order to comply with future legislation. Therefore, the advance computation of the nitrogen oxide emission is significant for the successful use of a combustion simulation. The nitrogen oxide emissions are preferably computed specifically to the fuel in the method for optimization. Besides good modeling ability, this also has the benefit that no emissions can occur without the injection of fuel.

Since the advent of exhaust gas recirculation, it has been possible to greatly reduce the nitrogen oxide emission, because low NOx emissions have been able to be achieved even without late injection start. The reason for the reduction of the nitrogen oxide emissions is a lowering of the temperature in the flame by the increased fraction of inert gas and the resulting higher specific calorific capacity of the charge. The NOx reduction potential of the exhaust gas recirculation depends not only on its rate, but also on the reduced oxygen concentration of the cylinder charge. This, in turn, depends on the EGR mass and its lambda, which in stationary operation corresponds to the air ratio of the combustion. The influence of humidity is approximately factored in by reduction of the oxygen concentration, while the reduction in the oxygen concentration by humidity is given equal weight with that by EGR. This yields the first preferable input parameter in the nitrogen oxide model, the oxygen concentration at combustion start.

The position [of the combustion] and its duration also have influence on the temperature, which is the primary factor of influence for the formation of NOx. The earlier the start of combustion, the higher the resulting combustion temperatures. Consequently, earlier combustion results in an increase in nitrogen oxide emissions. Another input parameter is therefore preferably the combustion start of the main injection.

At a given rotational speed, an increased constant volume level of combustion, an approximation to constant volume combustion, likewise results in a rise in temperature, since the same fuel quantity is converted in a shorter time. In reality, this occurs by raising the injection pressure and the associated shorter combustion duration, for example. Another input parameter is therefore preferably the combustion duration from combustion start to combustion center.

The formation of NOx does not enter into equilibrium during a combustion cycle. The longer the combustion lasts at rather high temperatures, the more NOx is formed. The higher the rotational speed, the faster the gas cools down in the combustion chamber, and the less the NOx emission. For this reason, the rotational speed is preferably an input in the empirical NOx model.

The relation between injected fuel mass and air mass, i.e., the air ratio lambda, likewise has influence on the nitrogen oxide emission. Rising lambda due to better oxygen availability encourages its dissociation, which is a prerequisite for the formation of nitrogen oxides. In this way, the rate of formation of NOx also rises. This is counterbalanced by the cooling effect on the combustion in the case of large air excess. At very small fuel quantities, the relatively large air mass has a cooling effect on the combustion, and the nitrogen oxide emissions are low. For this reason, the nitrogen oxide emission is also very low for the smallest quantities, such as during pre-injection processes. Starting from low lambda, the NOx emission increases up to an air ratio between 1.6 and 2.2, depending on the operating point. As of this air ratio, the effect of the available oxygen loses its significance, the cooling effect of the air excess becomes predominant, and the nitrogen oxide emissions decrease. Here as well, for reasons of modeling, not lambda but instead its reciprocal is preferably used as input parameter.

Another influence on the temperature level of combustion is the temperature at injection start. Both intake manifold temperature and compression ratio have a known influence on the nitrogen oxide emission. For this reason, the previously-calculated temperature at injection start of the main injection is preferably used as an input for the model. In this way, both the influence of an altered intake manifold temperature and that of the compression ratio on the nitrogen oxide emission are simulated. Furthermore, in this way the methods of Miller or Atkinson, and the associated reduction of NOx emissions, can be simulated.

Soot Emission

Three preferred input parameters in an empirical soot model shall be described below. The actual soot mass emitted from the cylinder depends on the one hand on the soot formation rate, and on the other hand on the soot oxidation rate. It should be noted that oxidation does not just start at the end of combustion, but already occurs during soot formation. Oxygen is necessary both for low soot formation rates and for the oxidation of soot. At low air ratios, more soot is formed, and the oxidation of soot is possible only to a slight extent due to the low oxygen concentration. For this reason, the fresh air mass or the lambda value is preferably an input parameter for formation and oxidation of soot. Due to worse conditions for soot oxidation due to low oxygen concentration and lower temperatures, soot emission usually increases with the EGR rate, which is therefore preferably another input parameter.

The formation of soot depends both on the mixture preparation and of course also on the temperature level of combustion. The higher the temperature, the more soot is formed. But temperatures of at least 1300 K are needed for the oxidation. Therefore, formation and oxidation of soot are opposed to each other. Increasing the injection pressure results in better mixture preparation, but also an increase in the rate of soot formation due to higher temperatures and faster fuel injection. Yet this is more than compensated by high temperature and turbulence level, which leads to a better oxidation, and the actual soot emission declines. Therefore, the injection pressure is also preferably an input parameter for an empirical model of soot emissions.

Figure 7:
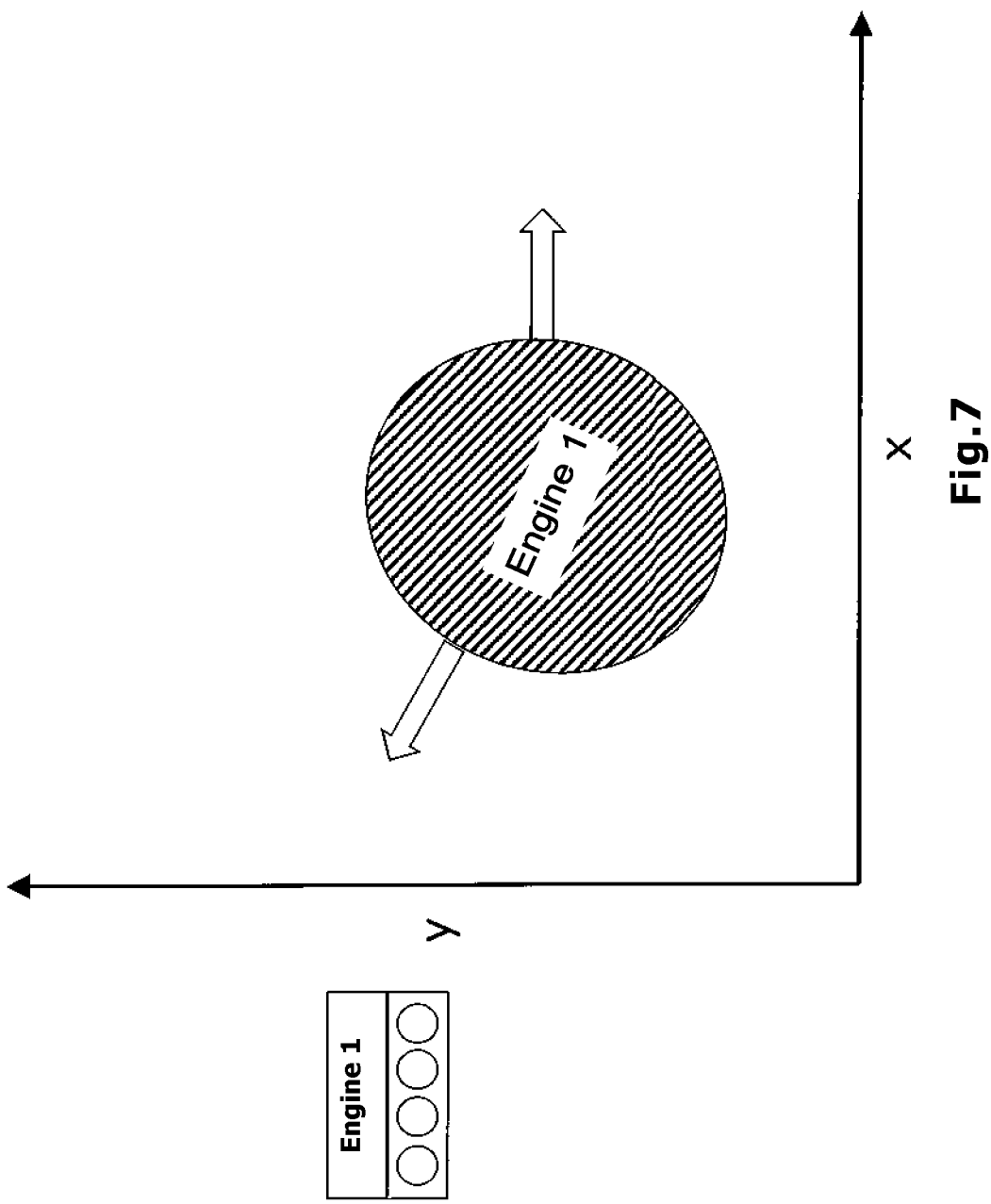
FIG. 7 shows a diagram of an operating range of an engine.
Figure 9:
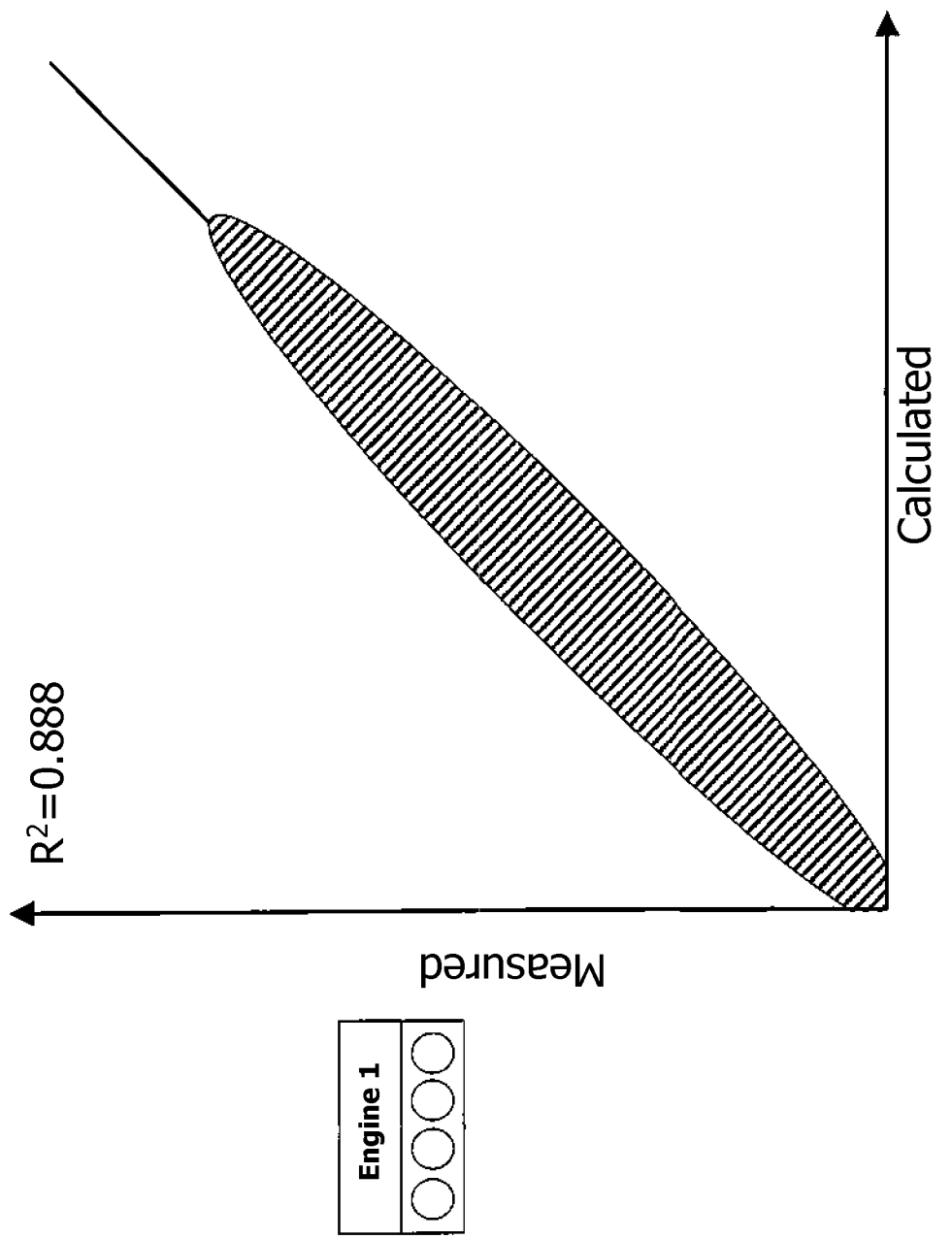
FIG. 9 shows another representation of the parity chart from FIG. 8.

FIGS. 7 to 9 show how a combustion model is determined for an individual prior-art engine (engine 1).

As shown in FIG. 7, the stationary operating range which is possible for this engine under given boundary conditions (pressure, temperature) is measured. The parameters x and y, which characterize the operating range of the engine, are for example charge pressure and air mass. When measuring a particular engine, due to physical constraints (such as pressure and temperature limits of engine components), only a certain operating range can be covered in stationary operation.

With the measurement data of the stationary measurements, a combustion model can be set up having a good predictive quality within the measured range. Outside of this range, the model is extrapolated, this being indicated by the two arrows in the diagram. The predictive quality in the extrapolation falls off sharply. The extrapolation of the model is necessary for the same engine if it is in transient rather than stationary operation, or if the boundary conditions therefore change.

For the creation of the combustion model, one may use for example a polynomial model, as represented above in formula (I). The coefficients $x_1$, $x_2$, $x_{1,2}$ are chosen to establish the best possible agreement between parameter values determined at the measured operating points and the parameter values determined by means of the combustion model. A corresponding parity chart for the evaluation of the model quality of such a combustion model is shown in FIG. 8. The coefficient of determination $R^2$ in this case is 0.888. An equivalent representation of the parity chart of FIG. 8 is shown in FIG. 9. The data cloud of measurement points of FIG. 8 is indicated here by the hatched area.

The combustion model developed per FIGS. 7 to 9 is only valid for the one internal combustion engine used to create the model. If another, unknown engine is to be likewise simulated with a combustion model, generally another measurement must be performed for the operating range of this engine, and a new determination of the coefficients of the polynomial model must be performed by a compensation calculation, for example. By way of example, FIGS. 10 to 12 show how a generic internal combustion engine model according to the invention can be developed for an entire class of engines.

Figure 10:
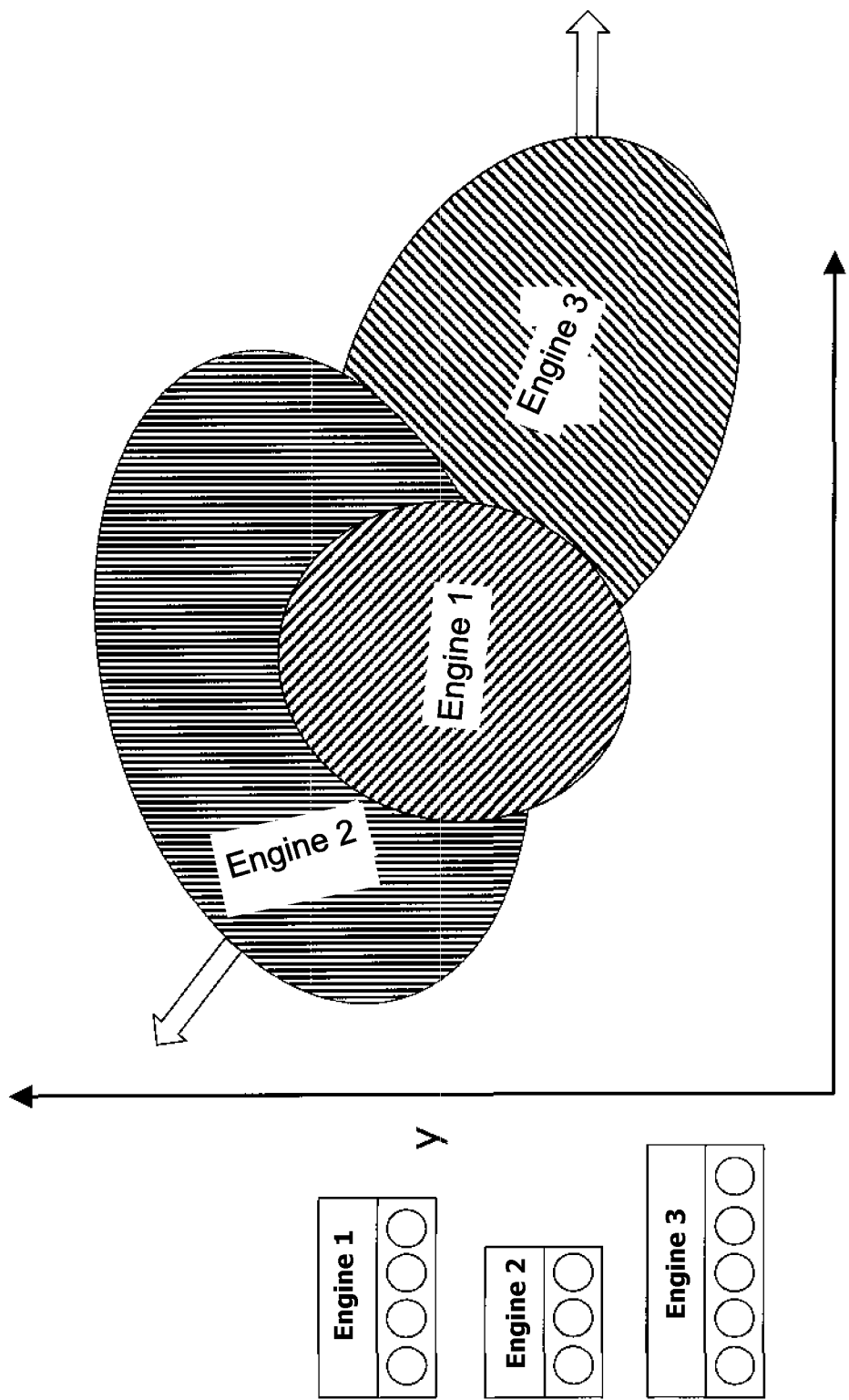
FIG. 10 shows a representation of an operating range of three engines.

As represented in FIG. 10, in order to create a generic combustion model, several different engines of one class are used, especially one type of combustion and one particular displacement range, which are the three engines Engine 1, Engine 2 and Engine 3 in the example shown. For example, Engine 1 has four cylinders, Engine 2 has three cylinders and Engine 3 has five cylinders. In addition, the displacements of the cylinders of the individual engines may also differ from each other.

For each of these engines, portions of the respective operating range are measured. Ideally, however, the measured operating ranges of the individual engines 1, 2, 3 only overlap and also cover different operating points in each case. These measurements will also be used to create a valid combustion model for this engine class. As represented in FIG. 10, the measurements of the different engines span a rather large operating range. This reduces those operating ranges in which the model has to be extrapolated, as indicated by the arrows. Now, in order to create the empirical model, the measured data from all three engines 1, 2, 3 is used rather than the data from a single engine. This means that, when using a polynomial model approach, the coefficients of the polynomial are determined with the help of the measurement data from all three engines.

Figure 11:
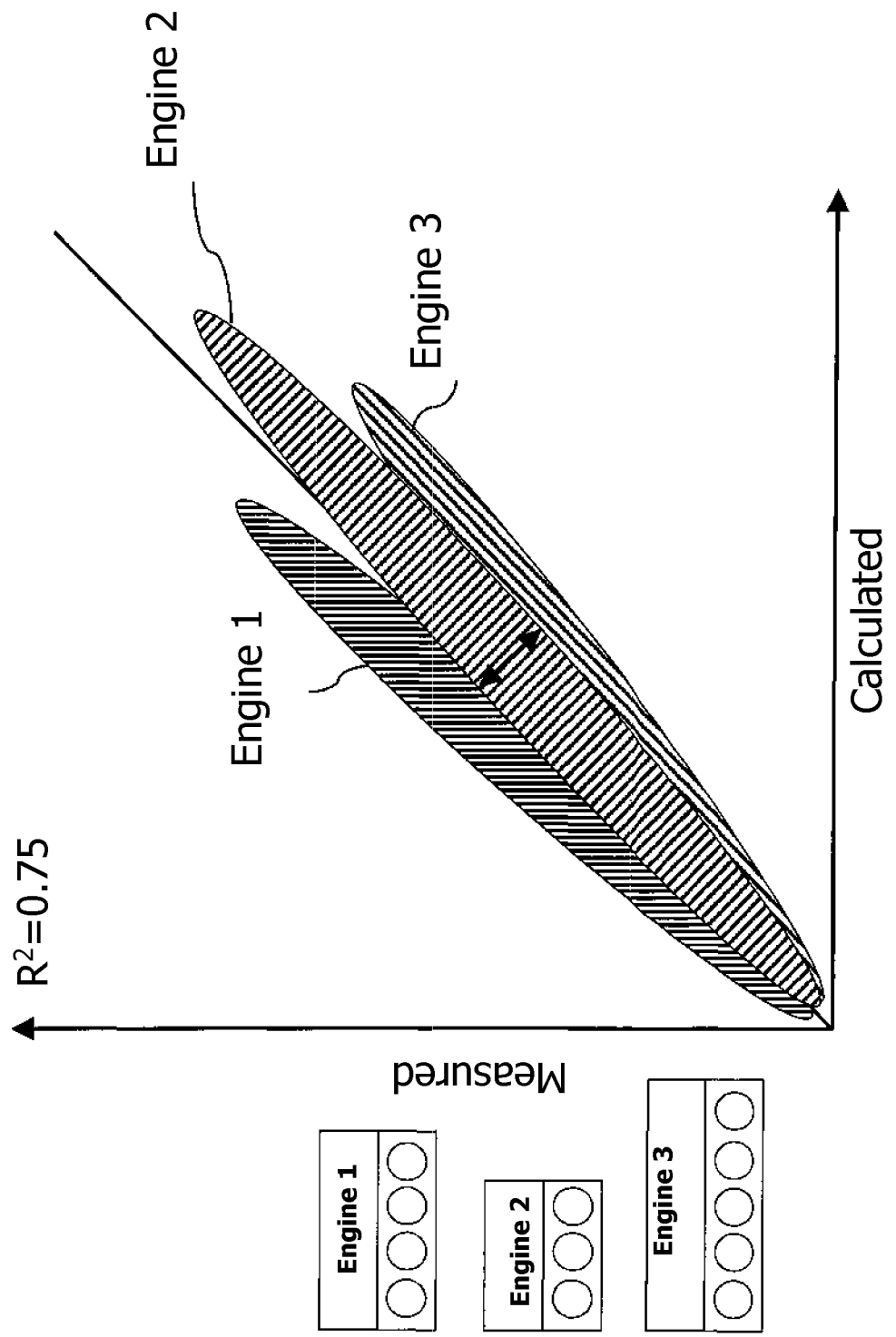
FIG. 11 shows a parity chart for an empirical Model based on the three engines.
Figure 12:
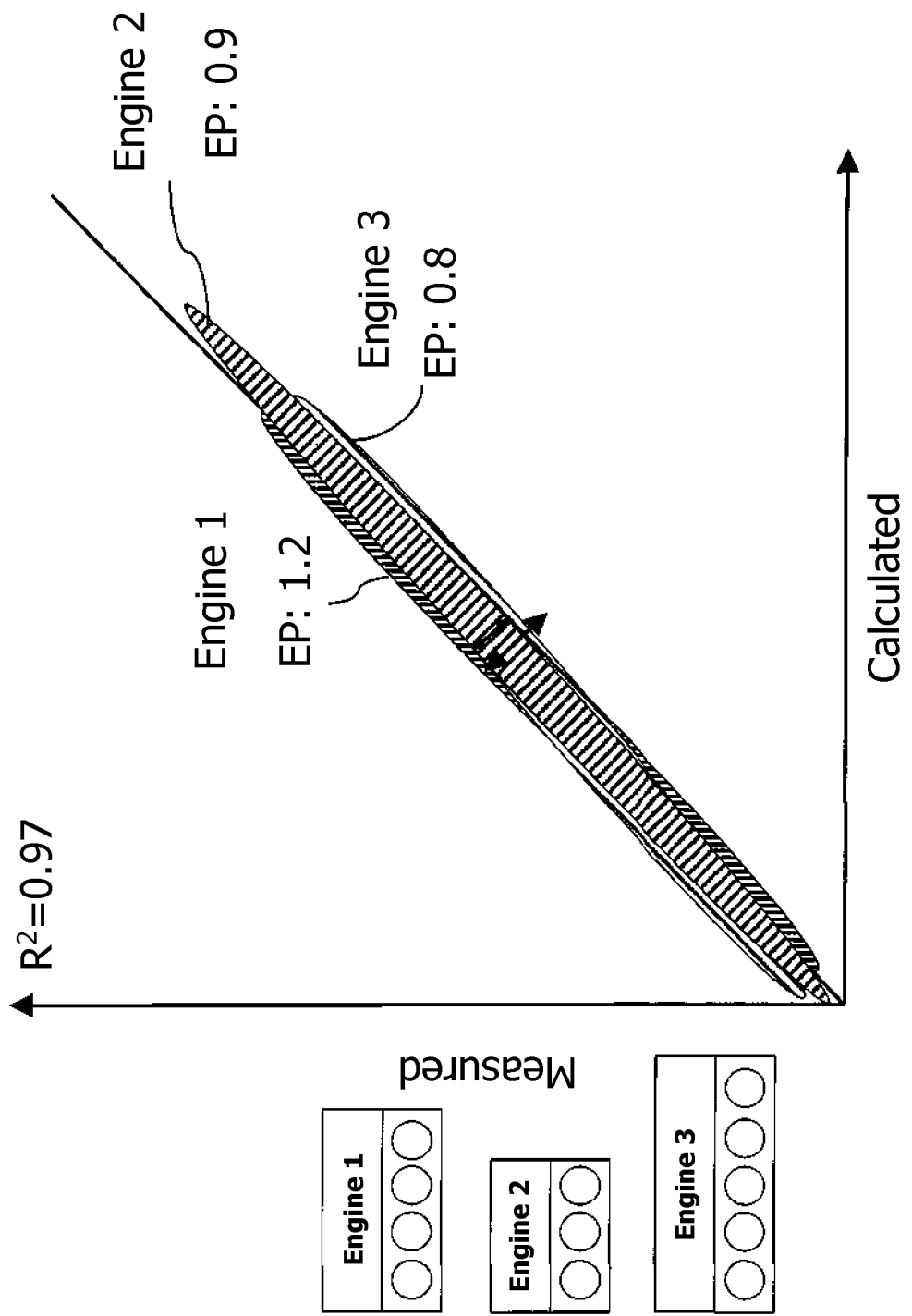
FIG. 12 shows a parity chart per FIG. 11, where setting parameters are taken into account in the empirical model.

The model quality of the empirical model so obtained is represented in regard to the measurement data of the individual engines in FIG. 11. Since the developed empirical model spans all three engines, the model quality is different in relation to each individual engine, as appears from the position and extent of the individual data clouds of the measurements (hatched areas) in regard to the individual engines 1, 2, 3. On the whole, a coefficient of determination of 0.75 is obtained in this case.

For a combustion model according to the invention, which preferably consists of a variety of physical models and empirical models, some of the empirical models attain only relatively low model quality, as can be seen from FIG. 11. This is primarily due to the fact that, in the generic modeling of the empirical models, physical effects such as the engine-specific interaction between injection spray and piston bowl or the injection behavior in accordance with nozzle orifice geometry cannot be adequately handled by the generic model. Neither is it normally possible to integrate these dependencies through an additional physical model.

In the present example of an empirical model for the operating range of all three engines 1, 2, 3, however, the model quality can be enhanced by introducing a setting parameter EP, as shown above in relation to equation (II). The setting parameter EP is given its own coefficient in a polynomial model approach. When performing the compensation calculation for the determination of the coefficients, the coefficient pertaining to the setting parameter EP is also set at a value for all three engines 1, 2, 3 and at the same time a value is determined for the setting parameter EP for each engine 1, 2, 3 which assures the best possible agreement of the measurement values of the particular engine with the empirical model. The agreement between the measured values of the data clouds for the individual engines 1, 2, 3 and the empirical submodel after modeling with the setting parameter is represented in FIG. 12. Now, a coefficient of determination of 0.97 is achieved between the measurements and the model, which represents a very good model quality.

By introducing the setting parameter, not only is it possible to improve the position of the particular measurement point distribution in the parity chart, as becomes clear from FIG. 12, but the scatter of the measurement points in the parity chart can also be reduced with regard to the particular empirical model, as indicated by the two double arrows (the longer double arrow corresponds to the scatter without setting parameter in regard to Engine 2 from FIG. 11).

Now, if the empirical model is used in a generic combustion model for a new, unknown Engine X, for which no operating range measurement is yet available, but which belongs to the same class as engines 1, 2, and 3, the respective empirical model can be adapted to the unknown Engine X simply by adjusting the setting parameter EP. In a combustion model according to the invention for a diesel engine, these are in particular the empirical models for the polytropic exponent, the ignition delay, the combustion center and the frictional power. The determination of the setting parameter EP can first be performed on the basis of experiential values of development engineers. In order to determine the setting parameter EP exactly, however, at least one operating point must be measured on the unknown Engine X. By matching up this at least one operating point against the values calculated by means of the generic combustion model, the setting parameters EP of the individual empirical models can be determined. Once the setting parameter EP is determined, an engine-specific combustion model will be available for the new, unknown Engine X, with which a very high agreement with the actual operation is achieved, as can be shown by means of FIGS. 16 and 17.

Figure 13:
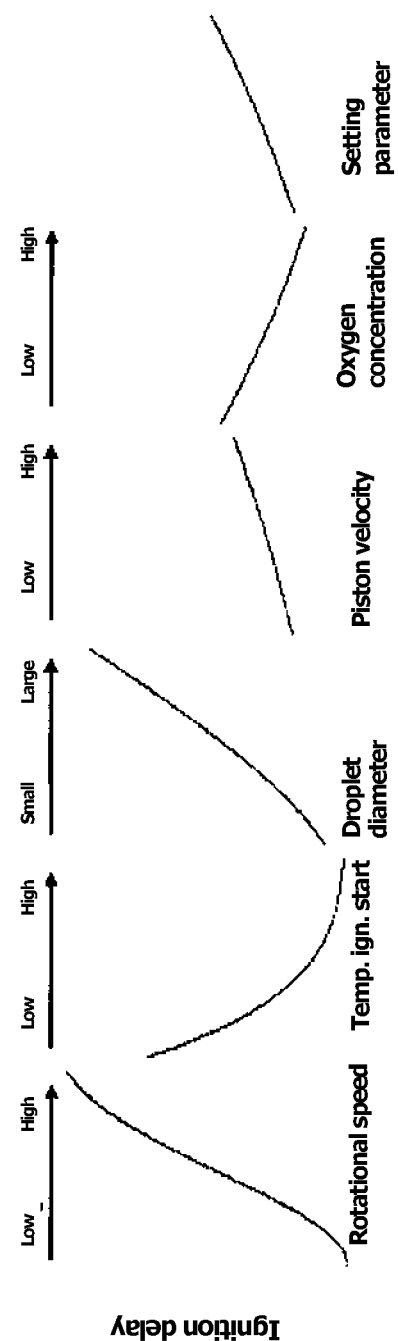
FIG. 13 shows an interaction diagram for individual input parameters in an empirical model of the ignition delay.

By way of example, FIG. 13 shows a so-called interaction diagram for an empirical model of the ignition delay. The interaction diagram indicates the direction of action of the individual input quantities or input parameters in the empirical model of the ignition delay. Such an interaction diagram can be used in particular for a know-how-based evaluation of the model quality in the plausibility evaluation. As follows from the example shown in FIG. 13, the dependence between the ignition delay and the setting parameter in this case is a second-degree curved function. However, for an individual engine 1, 2, 3, or X, the setting parameter is chosen only once for the particular empirical model and it remains constant for the entire operating range of the particular engine.

Figure 14:
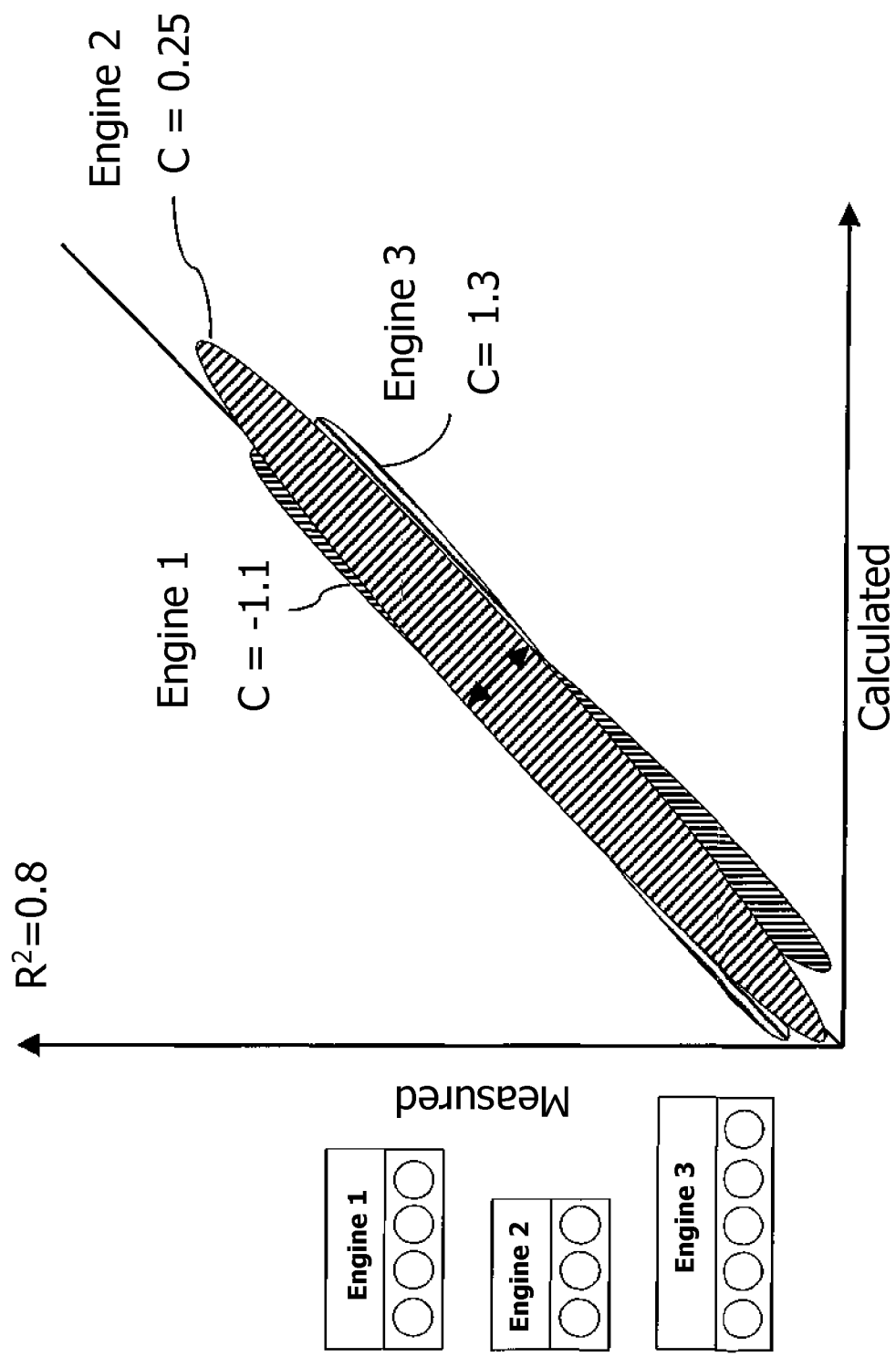
FIG. 14 shows a parity chart, wherein an empirical model provides various offsets for the individual engines.

FIG. 14 illustrates the difference between the influence of a constant offset value C in a polynomial model and the engine-specific setting parameter according to the invention. FIG. 14, like FIG. 12, is also based on the parity chart of FIG. 11. The individual data clouds of the measurement point distributions of the engines 1, 2, 3 have been shifted by introducing a constant offset value for each engine. Since the position of the individual distributions of the engines has improved in the parity chart, the coefficient of determination is slightly increased, yet it still lies in an unsatisfactory range of model quality. In particular, no decrease of scatter in the parity chart can be achieved by introducing an offset value in the polynomial model approach. Thus, the width of the distribution cloud in regard to Engine 2 in FIG. 14 is identical to that in FIG. 11. The use of a generic combustion model for the simulation of an entire class of internal combustion engines according to the method of the invention is therefore not possible by the simple introduction of offset values or correction factors.

Figure 15:
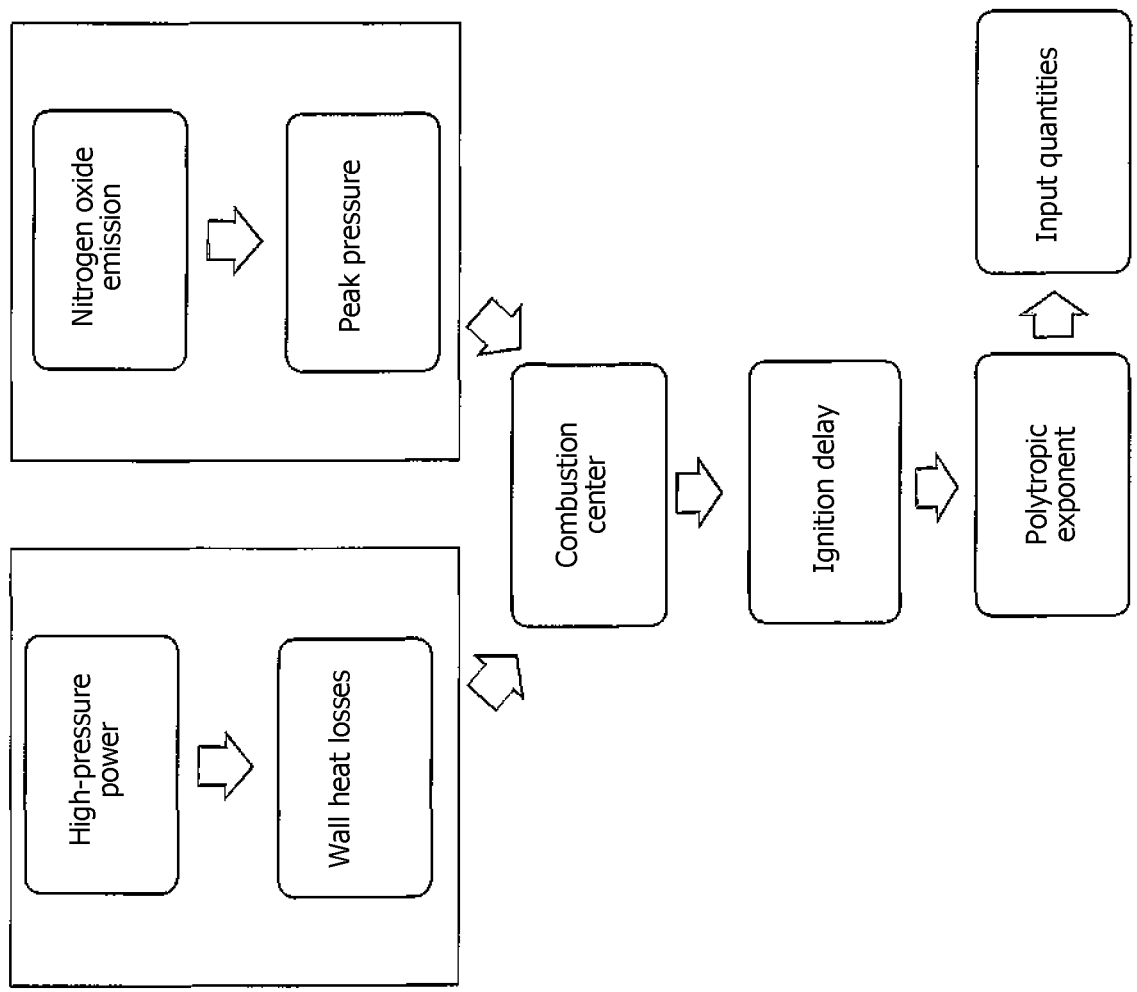
FIG. 15 shows the sequence during the creation of a model of the individual empirical models for a total simulation of an internal combustion engine in chronological sequence.

As represented in FIG. 15, when creating a combustion model which forms the foundation of the method according to the invention, one basically proceeds in reverse sequence, with the dependency of the individual submodels on each other given, i.e., in the reverse sequence of the information flow between the individual submodels, such as is represented for example in FIG. 4. One begins the creation of the model with those models which furnish the desired output quantities and as many models as needed are used until the desired output quantities can be determined from the available or given input quantities.

In the sample embodiment shown in FIG. 15 for the procedure of creating a model for a diesel engine, the indicated high-pressure power and wall heat losses as well as nitrogen emission and peak pressure need to be computed. It follows from this that models are needed for the combustion center, the ignition delay and the compression or the polytropic exponent as well as any other physical models in order to carry out a simulation with the aid of the input quantities normally provided by a control system. In the following, a sample application of the invention for the determination of parameters which characterize the operation of an internal combustion engine in the transient test cycle for off-road engines (NRTC) shall be discussed with the aid of FIGS. 16 and 17 in combination with an air pathway model and an exhaust gas aftertreatment model. Knowledge of the transient engine behavior in regard to thermodynamic variables as well as emissions is of great importance for investigating concepts in early phases of development or to establish optimal operating strategies. In the depicted example, the diesel particle filter (DPF) regeneration interval of an industrial engine was investigated for different load profiles by using the method according to the invention, and the operating strategy was further optimized.

In a first step, the method according to the invention was validated with the use of the legislated transient test cycle for off-road engines (NRTC). The engine model is operated with a software control unit, in which the most important functions of the real control unit are simulated. The regulators of the virtual control unit were tuned such that the transient behavior of the virtual engine corresponded to that of the real engine. With this kind of model use, one speaks of a model in the loop (MiL). In a second step, the industrial engine was subjected to the NRTC cycle in actual operation on a test stand.

Figure 16:
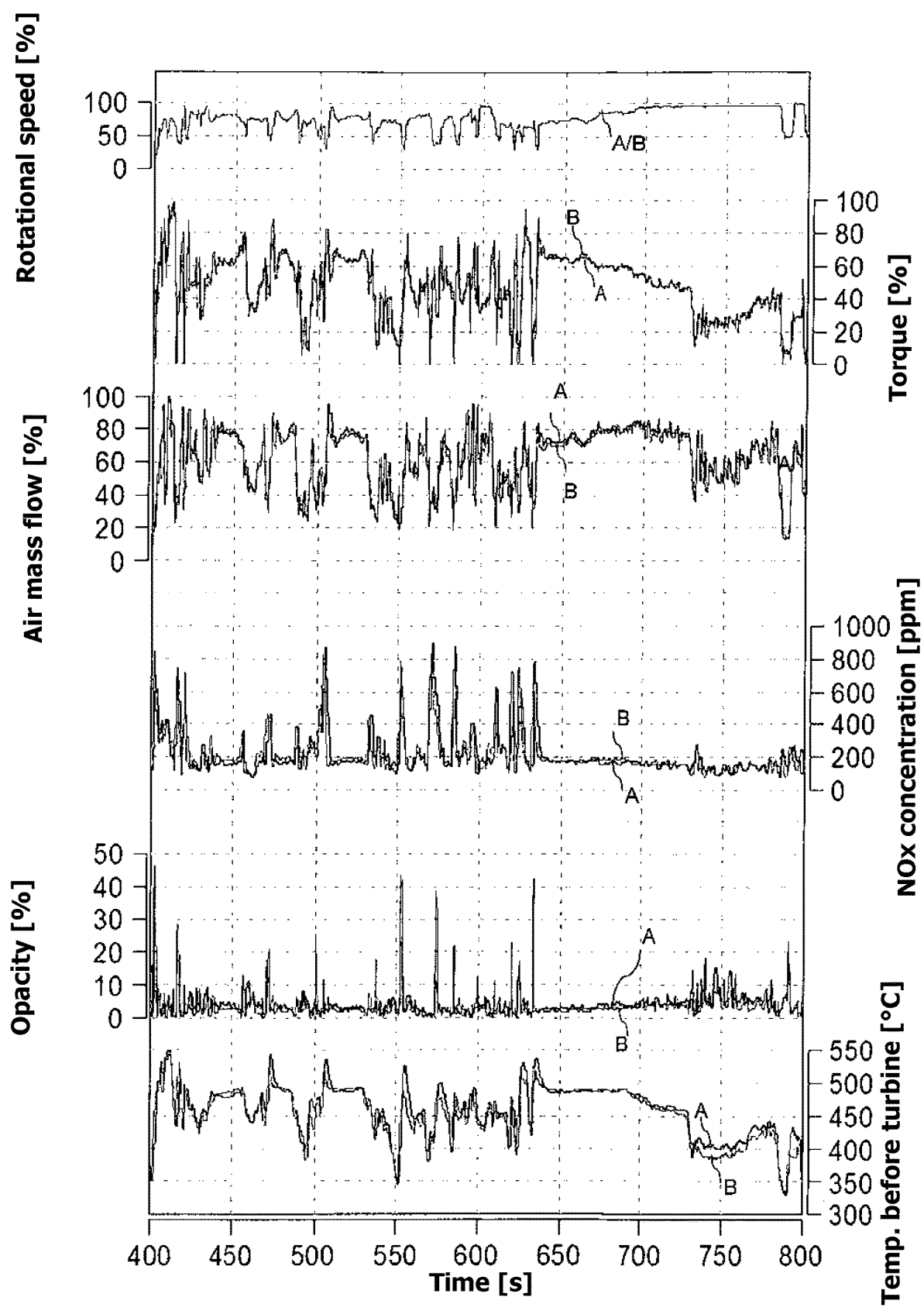
FIG. 16 shows several diagrams of parameters characterizing the operation of an internal combustion engine, both for values measured on a real internal combustion engine and values calculated.

Besides the values (B) determined with the method according to the invention, FIG. 16 shows the measured transient curves (A) for rotational speed, torque, and air mass, in normalized form. In addition, the temperature upstream from the turbine, the nitrogen oxide emission and the soot emission in transient operation are shown. The curves determined by means of the method according to the invention match up with the measured processes except for minor deviations.

Figure 17:
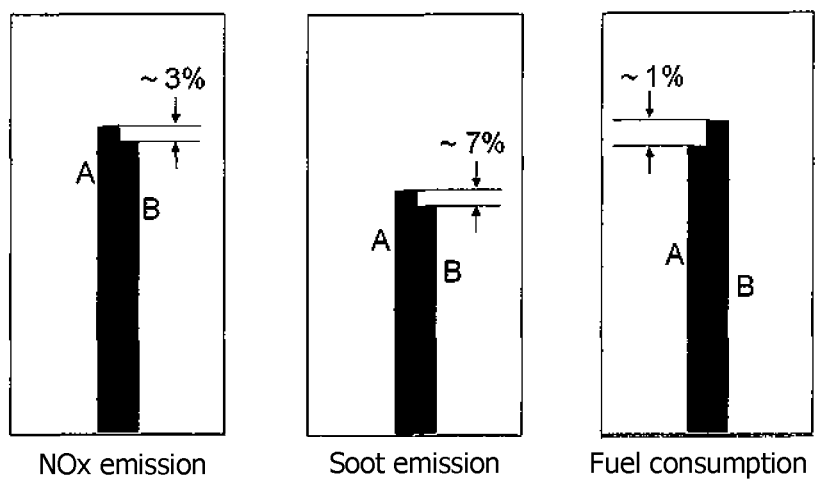
FIG. 17 shows a comparison of measured values with values calculated for several of the parameters from FIG. 16.

FIG. 17 shows a relative comparison of the cycle results of the transient emission test. One notices that the deviations in the cycle results for NOx, soot, and fuel consumption are significantly less than 10%. Therefore, the method according to the invention is well suited to the optimization of an internal combustion engine, without having to perform trials with the actual technical device being optimized.

In particular, it is also possible with the method and the device according to the embodiments hereof perform optimizations in intermediate stages or steps, with measurements on the test stand going hand in hand with optimizations using the described methods. In this way, one can ensure that the empirical models produced are not too distant from reality. Preferably, the empirical models can also be changed and adapted to real measurements in intermediate steps.

What is claimed is:

1. A method for model-based optimization and calibration of a technical device, comprising:
   detecting a first parameter in relation to the technical device being optimized, the first parameter characterizes a physical quantity;
   providing a first physical model that is characterized by at least one known physical relationship;
   inputting the first parameter into the first physical model such that the first parameter is an input parameter;
   providing a first empirical model comprising
   a machine-specific setting parameter, wherein the first empirical model is a polynomial model, and wherein the machine-specific setting parameter is an input into the first empirical model;
   determining a plurality of coefficients for the first empirical model using measurements on a plurality of already-known technical devices of the same kind by a compensation calculation, wherein the plurality of coefficients is the same for all technical devices of the same kind for which the first empirical model applies, and wherein the machine-specific setting parameter is multiplied by at least one coefficient in the plurality of coefficients;
   adapting the first empirical model to the technical device being optimized by selecting a value for the machine-specific setting parameter, the machine-specific setting parameter value being constant for the technical device being optimized;
   determining a second parameter in relation to the technical device being optimized using the first physical model;
   inputting at least the second parameter into the first empirical model such that the second parameter is an input parameter;
   determining a third parameter using the first empirical model, wherein the third parameter is suited to at least one of characterizing the technical device being optimized or providing a basis for making a change in the technical device being optimized; and
   outputting the third parameter.

2. The method as claimed in claim 1, wherein determining the third parameter is done solely for a predetermined point in time.

3. The method as claimed in claim 1, further comprising:
   normalizing the first parameter in relation to a performance potential of the technical device being optimized.

4. The method as claimed in claim 1, further comprising:
   determining a fourth parameter by a second physical model or by a second empirical model on a basis of the third parameter or on a basis of at least one first parameter from a plurality of first parameters or at least one second parameter from a plurality of second parameters, wherein the fourth parameter is suited to characterizing the technical device being optimized or to providing a basis for making a change in the technical device being optimized; and
   outputting the fourth parameter.

5. The method as claimed in claim 4, further comprising:
   determining an additional parameter by an additional physical model or by an additional empirical model on the basis of the third parameter, the fourth parameter, at least one first parameter from the plurality of first parameters, or the at least one second parameter from the plurality of second parameters, wherein the additional parameter is suited to characterizing the technical device being optimized or to providing a basis for making a change in the technical device being optimized; and
   outputting the additional parameter.

6. The method as claimed in claim 5, wherein determining at least one of the fourth parameter or the additional parameter is performed at a different point in time than the predetermined point in time when the determining of the third parameter is done.

7. The method as claimed in claim 5, wherein the detecting the first parameter, the determining the second parameter, the determining the third parameter, the determining the fourth parameter, and the determining the additional parameter are performed without measurements on the technical device being optimized.

8. The method as claimed in claim 1, wherein a different machine-specific setting parameter is used for each different model.

9. The method as claimed in claim 1, wherein the machine-specific setting parameter is included in two or more terms of the first empirical model, wherein the machine-specific setting parameter is multiplied by two or more coefficients in the plurality of coefficients, and wherein the machine-specific setting parameter is multiplied by the second parameter in at least one of the two or more terms of the first empirical model.

10. A method for model-based optimization of a technical device, the method comprising:
    simulating a complete system of the technical device being optimized with a first physical model, which characterizes a known physical relationship, and with an empirical model comprising a machine-specific setting parameter, wherein the empirical model is a polynomial model, and wherein the machine-specific setting parameter is an input into the empirical model;
    inputting a first parameter of the technical device being optimized into the first physical model such that the first parameter is an input parameter of the first physical model, the first parameter characterizing a physical quantity;
    determining a plurality of coefficients for the first empirical model using measurements on a plurality of already-known technical devices of the same kind by a compensation calculation, wherein the plurality of coefficients is the same for all technical devices of the same kind;
    in a first phase of the method, adapting the empirical model to the technical device being optimized by measuring a measurement point during operation of the technical device being optimized and determining a value for the machine-specific setting parameter on a basis of the measurement point by comparing measured values with values of the measurement point calculated with the empirical model, wherein the value of the machine-specific setting parameter is identical for all operating points of the technical device being optimized;

multiplying the machine-specific setting parameter by at least one coefficient in the plurality of coefficients;
in a second phase of the method where no more measurements are taken, simulating the complete system of the technical device being optimized by means of the first physical model and the empirical model;
determining a second parameter in relation to the technical device being optimized using the first physical model; and
entering the second parameter into the empirical model as an input parameter.

11. The method as claimed in claim 10, further comprising:
determining a third parameter using the empirical model; and
outputting the third parameter, wherein the third parameter is suited to characterizing the technical device being optimized or to providing a basis for making a change in the technical device being optimized.

12. The method as claimed in claim 11, further comprising:
detecting the second parameter as determined by the first physical model;
wherein the machine-specific setting parameter as used in the empirical model is also determined on a basis of the detected second parameter;
detecting the third parameter as outputted by the empirical model;
determining a second machine-specific setting parameter on a basis of the detected third parameter;
detecting a fourth parameter;
determining a third machine-specific setting parameter on a basis of the detected fourth parameter;
detecting an additional parameter; and
determining a fourth machine-specific setting parameter on a basis of the detected additional parameter.

13. The method as claimed in claim 12, further comprising:
changing the first parameter of the technical device being optimized on a basis of at least one of the third parameter, the fourth parameter, or the additional parameter.

14. The method as claimed in claim 12, further comprising:
evaluation of at least one of the third parameter, the fourth parameter, or the additional parameter with the aid of a reference; and
outputting the evaluation.

15. The method as claimed in claim 10, wherein a compression setting parameter, an ignition delay setting parameter, a combustion duration/MFB50 setting parameter and an engine friction setting parameter, a volumetric efficiency setting parameter, a charge calculation setting parameter, a residual gas content setting parameter, a charge exchange losses setting parameter, and a high-pressure performance setting parameter are available for use as the machine-specific setting parameter.

16. The method as claimed in claim 10, wherein the technical device being optimized is an internal combustion engine, and wherein the internal combustion engine is defined by at least one of:
a) a nozzle, a combustion chamber, and a charge movement,
b) valve characteristics and an inlet channel geometry, or
c) power loss characteristics.

17. The method as claimed in claim 10, wherein the value of the machine-specific setting parameter is identical for a group of technical devices of the same kind.

18. The method as claimed in claim 10, wherein a starting value for the machine-specific setting parameter of the technical device being optimized is determined based on values of machine-specific setting parameters of the plurality of already-known technical devices.

19. The method as claimed in claim 10, further comprising:
measuring an additional measurement point in the operation of the technical device being optimized; and
further determining the value for the machine-specific setting parameter on a basis of the additional measurement point by comparing measured values to calculated values of the first parameter or the second parameter for identical input parameters.

20. The method as claimed in claim 10, wherein the first parameter is specified or set by a control unit for the technical device being optimized.

21. The method as claimed in claim 10, wherein the first parameter can be influenced by changing design features of the technical device being optimized.

22. A non-transitory computer readable medium comprising computer executable instructions for executing the steps of the method as claimed in claim 10.

23. A processor that executes the instructions stored on the non-transitory medium of claim 22.

24. A device for model-based optimization of a technical device, the device comprising:
a sensor for detecting a first parameter in relation to the technical device to be optimized, wherein the first parameter is suitable for characterizing a physical quantity;
a storage device configured to store a first physical model of a known physical relationship and a first empirical model comprising a machine-specific setting parameter and a plurality of coefficients, wherein the plurality of coefficients is determined based on measurements on a plurality of already-known technical devices of the same kind and the plurality of coefficients is the same for technical devices of the same kind, and wherein the first empirical model is a polynomial model;
a processor configured to allocate the first parameter on a basis of the first physical model to a second parameter and configured to allocate a third parameter on a basis of the first empirical model to the second parameter; and
a user interface configured to output the third parameter,
wherein the third parameter is suited to characterize the technical device being optimized or to provide a basis for making changes in the technical device being optimized,
wherein the first empirical model depends on the machine-specific setting parameter being an additional input of the first empirical model in order to adapt the first empirical model to the technical device being optimized,
wherein the machine-specific setting parameter is multiplied by at least one coefficient in the plurality of coefficients, and
wherein the machine-specific setting parameter has a constant value for the technical device being optimized.

* * * * *